US012734798B2

(12) United States Patent
Nozawa et al.

(10) Patent No.: US 12,734,798 B2
(45) Date of Patent: Sep. 15, 2026

(54) DRIVE CIRCUIT BOARD AND LIQUID EJECTION APPARATUS

(71) Applicant: SEIKO EPSON CORPORATION, Tokyo (JP)

(72) Inventors: Dai Nozawa, Matsumoto (JP); Noritaka Ide, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 137 days.

(21) Appl. No.: 18/898,819

(22) Filed: Sep. 27, 2024

(65) Prior Publication Data

US 2025/0108606 A1 Apr. 3, 2025

(30) Foreign Application Priority Data

Sep. 29, 2023 (JP) ................................ 2023-170046

(51) Int. Cl.
*B41J 2/045* (2006.01)
*B41J 2/14* (2006.01)

(52) U.S. Cl.
CPC ......... *B41J 2/04541* (2013.01); *B41J 2/0455* (2013.01); *B41J 2/0457* (2013.01); *B41J 2/04581* (2013.01); *B41J 2/04593* (2013.01); *B41J 2/04588* (2013.01); *B41J 2002/14491* (2013.01)

(58) Field of Classification Search
CPC .... B41J 2/04541; B41J 2/0455; B41J 2/0457; B41J 2/04581; B41J 2/04593; B41J 2/04588; B41J 2002/14491
See application file for complete search history.

(56) References Cited

U.S. PATENT DOCUMENTS

2022/0097358 A1 3/2022 Ide et al.
2022/0169011 A1* 6/2022 Ide ........................ B41J 2/0455

FOREIGN PATENT DOCUMENTS

JP 2022-057171 A 4/2022

* cited by examiner

*Primary Examiner* — Henok D Legesse
(74) *Attorney, Agent, or Firm* — Harness, Dickey & Pierce, P.L.C.

(57) ABSTRACT

A drive circuit board includes a drive circuit that includes a first driver circuit, a first switching element pair configured to output a first switching signal, a second driver circuit, a second switching element pair configured to output a second switching signal corresponding to the first switching signal, a smoothing circuit configured to output the drive signal obtained by smoothing the second switching signal, and a bootstrap circuit that includes a first capacitor, shifts a level of a power supply voltage to be supplied to the first switching element pair, and supplies the power supply voltage to the second switching element pair, wherein a distance between the first capacitor and the first switching element pair is longer than a distance between the first capacitor and the second switching element pair.

14 Claims, 7 Drawing Sheets

DRIVE CIRCUIT BOARD AND LIQUID EJECTION APPARATUS

The present application is based on, and claims priority from JP Application Serial Number 2023-170046, filed Sep. 29, 2023, the disclosure of which is hereby incorporated by reference herein in its entirety.

BACKGROUND

1. Technical Field

The present disclosure relates to a drive circuit board and a liquid ejection apparatus.

2. Related Art

As a liquid ejection apparatus that ejects a liquid to form an image or a document on a medium, a liquid ejection apparatus using a piezoelectric element is known. In such a liquid ejection apparatus, the piezoelectric elements are provided to correspond respectively to the plurality of nozzles that ejects the liquid, and each of the plurality of nozzles is driven in accordance with a drive signal. Then, by the piezoelectric element being driven, the liquid is discharged from the nozzle provided corresponding to that piezoelectric element. In order to operate such a piezoelectric element, it is necessary to supply a sufficient current. Therefore, the drive circuit for outputting the drive signal for driving the piezoelectric element is configured including an amplifier circuit for amplifying the source signal that is the basis of the drive signal with an amplifier circuit.

For example, JP-A-2022-057171 discloses a drive circuit that includes an amplifier circuit that modulates and amplifies a base drive signal serving as a basis of the drive signal, and a level shift circuit that shifts a reference potential of an output of the amplifier circuit, and outputs a drive signal for driving the piezoelectric element by smoothing an output of the level shift circuit. In such a drive circuit as described in JP-A-2022-057171, power consumption can be reduced as compared with an amplifier circuit using an AB-class amplifier circuit or a typical D-class amplifier circuit.

JP-A-2022-057171 is an example of the related art.

Incidentally, from the viewpoint of stabilizing the operation of the drive circuit that outputs the drive signal, how to mount the drive circuit on the wiring board is also one of important factors. However, JP-A-2022-057171 does not describe how to arrange the drive circuit on the wiring board, and there is room for further improvement.

SUMMARY

One aspect of the drive circuit board according to the present disclosure is a drive circuit board configured to output a drive signal for driving a capacitive load, the drive circuit board including a drive circuit configured to output the drive signal corresponding to a base drive signal, and a wiring board provided with the drive circuit, wherein the drive circuit includes a first switching circuit including a first driver circuit configured to output a first drive signal corresponding to the base drive signal and a first switching element pair that is driven in accordance with the first drive signal to output a first switching signal, a second switching circuit including a second driver circuit configured to output a second drive signal corresponding to the base drive signal and a second switching element pair that is driven in accordance with the second drive signal to output a second switching signal corresponding to the first switching signal, a smoothing circuit configured to smooth the second switching signal and output the second switching signal thus smoothed as the drive signal, and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, and a shortest distance between the first capacitor and the first switching element pair is longer than a shortest distance between the first capacitor and the second switching element pair.

One aspect of the liquid ejection apparatus according to the present disclosure includes a drive circuit board configured to output a drive signal for driving a capacitive load, and a print head configured to eject a liquid by driving the capacitive load, wherein the drive circuit board includes a drive circuit configured to output the drive signal corresponding to a base drive signal, and a wiring board provided with the drive circuit, the drive circuit includes a first switching circuit including a first driver circuit configured to output a first drive signal corresponding to the base drive signal and a first switching element pair that is driven in accordance with the first drive signal to output a first switching signal, a second switching circuit including a second driver circuit configured to output a second drive signal corresponding to the base drive signal and a second switching element pair that is driven in accordance with the second drive signal to output a second switching signal corresponding to the first switching signal, a smoothing circuit configured to smooth the second switching signal and output the second switching signal thus smoothed as the drive signal, and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, and a shortest distance between the first capacitor and the first switching element pair is longer than a shortest distance between the first capacitor and the second switching element pair.

DESCRIPTION OF EMBODIMENTS

A preferred embodiment of the present disclosure will hereinafter be described using the drawings. The drawings to be used are for the sake of convenience of explanation. Note that the embodiment to be described below do not unreasonably limit the content of the present disclosure set forth in the appended claims. Further, it is not necessarily true that all the configurations to be described below are essential elements of the present disclosure.

Further, the liquid ejection apparatus according to the present disclosure is a printing apparatus that ejects ink as a liquid, and will be described citing an inkjet printer as an example, but the liquid ejection apparatus is not limited to the inkjet printer, and may be, for example, a color material ejection apparatus used for manufacturing a color filter for a liquid crystal display or the like, an electrode material ejection apparatus used for forming electrodes in an organic EL display, a surface emitting display, and so on, or a bio-organic material ejection apparatus used for manufacturing a biochip.

1. Overview of Liquid Ejection Apparatus

Figure 1:
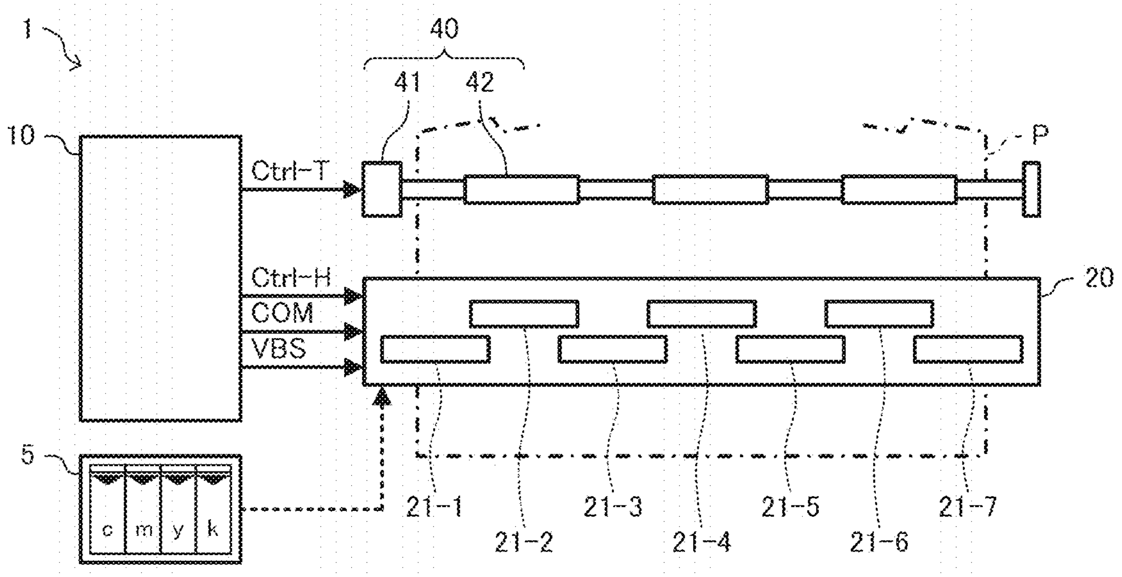
FIG. 1 is a diagram showing a schematic structure of a liquid ejection apparatus.

FIG. 1 is a diagram showing a schematic structure of a liquid ejection apparatus 1. The liquid ejection apparatus 1 according to the present embodiment is a so-called line printing type inkjet printer which conveys a medium P along a conveyance direction, and ejects ink as an example of a liquid to the medium P thus conveyed with print heads 21-1 to 21-7 disposed side by side along a main scanning direction crossing the conveyance direction to thereby form an image on the medium P. Such a liquid ejection apparatus 1 can use any printing target such as print paper, a resin film, or a fabric as the medium P. Note that the liquid ejection apparatus 1 is not limited to the line printing-type inkjet printer, but may be a serial printing-type inkjet printer.

As illustrated in FIG. 1, the liquid ejection apparatus 1 includes an ink container 5, a control mechanism 10, an ejection mechanism 20, and a conveyance mechanism 40.

The ink container 5 stores ink of a plurality of colors to be ejected onto the medium P. Examples of the color of the ink stored in the ink container 5 include black k, cyan c, magenta m, and yellow y. As such an ink container 5, an ink cartridge, an ink pack that is shaped like a bag, and is formed of a flexible film, an ink tank in which the ink can be replenished, or the like may be used.

The control mechanism 10 includes, for example, a processing circuit such as a central processing unit (CPU) or a field programmable gate array (FPGA), and a storage circuit such as a semiconductor memory device. The control mechanism 10 controls elements including the ejection mechanism 20 of the liquid ejection apparatus 1.

The ejection mechanism 20 includes the print heads 21-1 to 21-7. The print heads 21-1 to 21-7 are arranged in a staggered manner in the order of the print head 21-1, the print head 21-2, the print head 21-3, the print head 21-4, the print head 21-5, the print head 21-6, and the print head 21-7 along a scanning direction crossing the conveyance direction in which the medium P is conveyed.

Control signals Ctrl-H, drive signals COM, and a reference voltage signal VBS output by the control mechanism 10 are input to the ejection mechanism 20. The control signals Ctrl-H, the drive signals COM, and the reference voltage signal VBS are input to the print heads 21-1 to 21-7, respectively. Further, the ink stored in the ink container 5 is supplied to each of the print heads 21-1 to 21-7 via a tube (not shown) or the like. Each of the print heads 21-1 to 21-7 ejects the ink supplied from the ink container 5 based on the control signal Ctrl-H, the drive signal COM, and the reference voltage signal VBS thus input.

The conveyance mechanism 40 includes a conveyance motor 41 and conveyance rollers 42. The conveyance motor 41 is rotationally driven based on the control signal Ctrl-T input from the control mechanism 10. The conveyance rollers 42 rotate in accordance with the rotational drive of the conveyance motor 41. Due to the rotation of the conveyance rollers 42, the medium P is conveyed along the conveyance direction.

As described above, in the liquid ejection apparatus 1 according to the present embodiment, the control mechanism 10 controls the conveyance of the medium P and the ejection of the ink from the ejection mechanism 20. That is, the ejection mechanism 20 ejects the ink at a timing interlocked with the conveyance of the medium P by the conveyance mechanism 40. Thus, the ink ejected from the ejection mechanism 20 lands at a desired position on the medium P. As a result, a desired image is formed on the medium P.

2. Functional Configuration of Liquid Ejection Apparatus

Figure 2:
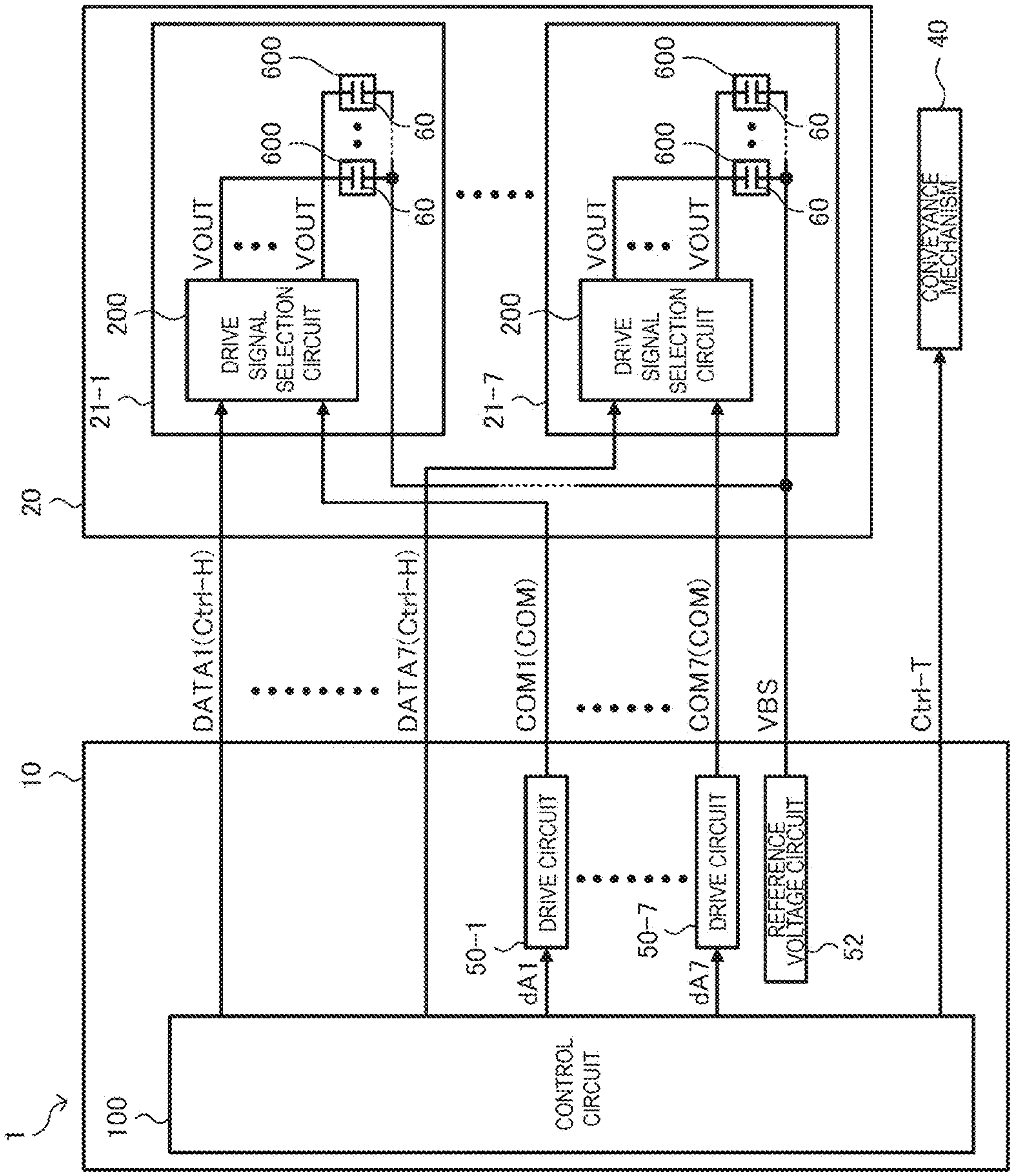
FIG. 2 is a diagram showing a functional configuration of the liquid ejection apparatus.

Then, a functional configuration of the liquid ejection apparatus 1 will be described. FIG. 2 is a diagram showing a functional configuration of the liquid ejection apparatus 1. As illustrated in FIG. 2, the liquid ejection apparatus 1 includes the control mechanism 10, the ejection mechanism 20, and the conveyance mechanism 40.

The control mechanism 10 includes drive circuits 50-1 to 50-7, a reference voltage circuit 52, and a control circuit 100.

The control circuit 100 includes a processor such as a microcontroller, and is communicably coupled to an external device such as a host computer (not shown) disposed outside the liquid ejection apparatus 1. An image information signal including image data to be formed on the medium P is input from the external device to the control circuit 100. The control circuit 100 performs predetermined image processing on the image information signal thus input to generate various data and signals corresponding to the data for controlling the liquid ejection apparatus 1, and outputs the data and the signals thus generated to corresponding elements.

The control circuit 100 generates the control signal Ctrl-T for controlling the conveyance of the medium P, and outputs the control signal Ctrl-T to the conveyance mechanism 40. Thus, the conveyance motor 41 provided to the conveyance mechanism 40 is rotationally driven, and the conveyance of the medium P along the conveyance direction is controlled.

Here, the control signal Ctrl-T output by the control circuit 100 may be subjected to a signal conversion in a driver circuit (not shown) and then input to the conveyance motor 41.

The control circuit 100 generates print data signals DATA1 to DATA7 as the control signals Ctrl-H for controlling the ejection mechanism 20 based on the image information signal input thereto, and outputs the print data signals DATA1 to DATA7 to the ejection mechanism 20.

The control circuit 100 outputs base drive signals dA1 to dA7, which are digital signals, to the drive circuits 50-1 to 50-7, respectively. The drive circuits 50-1 to 50-7 generate drive signals COM1 to COM7 as the drive signals COM in accordance with the base drive signals dA as the digital signals input thereto. Then, the drive circuits 50-1 to 50-7 output the drive signals COM1 to COM7 thus generated to the ejection mechanism 20. Specifically, the drive circuit 50-1 generates the drive signal COM1 and outputs the drive signal COM1 to the ejection mechanism 20, the drive circuit 50-7 generates the drive signal COM7 and outputs the drive signal COM7 to the ejection mechanism 20, and the drive circuit 50-*i* (i is any one of 1 to 7) generates the drive signal COMi and outputs the drive signal COMi to the ejection mechanism 20.

The reference voltage circuit 52 generates a reference voltage signal VBS serving as a reference potential for the drive of the piezoelectric element 60 which is provided to the ejection mechanism 20, and will be described later. Then, the reference voltage circuit 52 outputs the reference voltage signal VBS thus generated to the ejection mechanism 20. Such a reference voltage signal VBS is a signal constant in voltage value, and may be, for example, a signal having a ground potential with a voltage value of 0 V, or a signal having a DC voltage with a voltage value such as 5.5 V or 6 V.

The ejection mechanism 20 includes the print heads 21-1 to 21-7. Each of the print heads 21-1 to 21-7 includes a drive signal selection circuit 200 and a plurality of ejection units 600. Each of the plurality of ejection units 600 includes a piezoelectric element 60.

The drive signal selection circuit 200 provided to the print head 21-1 is configured including a single integrated circuit device, or a plurality of integrated circuit devices. The print data signal DATA1 and the drive signal COM1 are input to the drive signal selection circuit 200 provided to the print head 21-1. The drive signal selection circuit 200 provided to the print head 21-1 selects or deselects the signal waveform of the drive signal COM1 based on the print data signal DATA1 input thereto to thereby generate a drive voltage VOUT corresponding individually to each of the plurality of ejection units 600 and then output the drive voltage VOUT to the corresponding ejection unit 600.

The drive signal selection circuit 200 provided to the print head 21-7 is configured including a single integrated circuit device, or a plurality of integrated circuit devices. The print data signal DATA7 and the drive signal COM7 are input to the drive signal selection circuit 200 provided to the print head 21-7. The drive signal selection circuit 200 provided to the print head 21-7 selects or deselects the signal waveform of the drive signal COM7 based on the print data signal DATA7 input thereto to thereby generate a drive voltage VOUT corresponding individually to each of the plurality of ejection units 600 and then output the drive voltage VOUT to the corresponding ejection unit 600.

The drive signal selection circuit 200 provided to the print head 21-*i* is configured including a single integrated circuit device, or a plurality of integrated circuit devices. The print data signal DATAi and the drive signal COMi are input to the drive signal selection circuit 200 provided to the print head 21-*i*. The drive signal selection circuit 200 provided to the print head 21-*i* selects or deselects the signal waveform of the drive signal COMi based on the print data signal DATAi input thereto to thereby generate a drive voltage VOUT corresponding individually to each of the plurality of ejection units 600 and then output the drive voltage VOUT to the corresponding ejection unit 600.

Here, the drive circuits 50-1 to 50-7 are the same in configuration, and are referred to as a drive circuit 50 in some cases when there is no need to distinguish them from each other. The description will be presented assuming that the drive circuit 50 outputs the drive signals COM as the drive signals COM1 to COM7 based on the base drive signals dA as the base drive signals dA1 to dA7. Further, the print heads 21-1 to 21-7 are substantially the same in configuration, and are referred to as print heads 21 in some cases when there is no need to distinguish them from each other. On this occasion, the description will be presented assuming that the print data signals DATA as the print data signals DATA1 to DATA7 and the drive signals COM are input to the print head 21.

Figure 3:
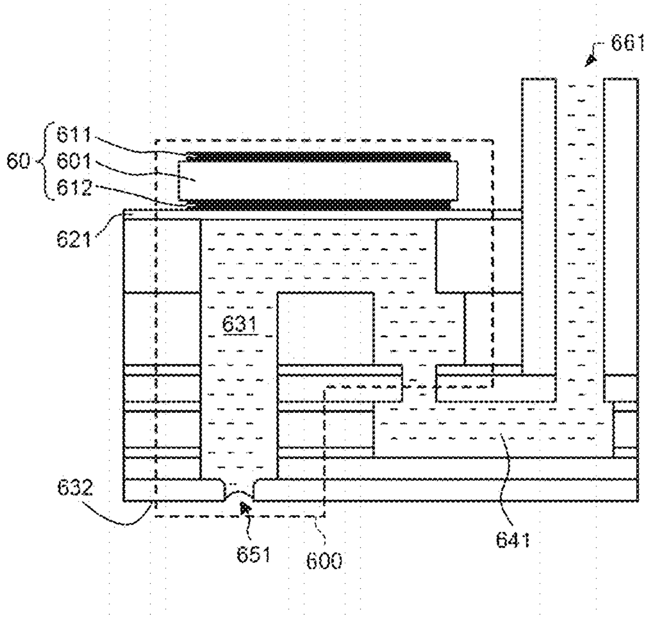
FIG. 3 is a diagram illustrating a schematic configuration of an ejection unit.

Then, a configuration of the ejection unit 600 to be supplied with the drive voltage VOUT will be described. FIG. 3 is a diagram illustrating a schematic configuration of the ejection unit 600. FIG. 3 illustrates a nozzle plate 632, a reservoir 641, and a supply port 661 in addition to the ejection unit 600.

As illustrated in FIG. 3, the ejection unit 600 includes the piezoelectric element 60, a vibration plate 621, a cavity 631, and a nozzle 651. The piezoelectric element 60 includes a piezoelectric body 601 and electrodes 611, 612. The piezoelectric element 60 is formed by the electrode 611, 612 being located across the piezoelectric body 601. Such a piezoelectric element 60 is driven so that a central portion is displaced in a vertical direction in accordance with a potential difference between a voltage supplied to the electrode 611 and a voltage supplied to the electrode 612. Specifically, the drive voltage VOUT based on the drive signal COM is supplied to the electrode 611, and the reference voltage signal VBS is supplied to the electrode 612. When the voltage value of the drive voltage VOUT supplied to the electrode 611 changes, the potential difference between the drive voltage VOUT supplied to the electrode 611 and the reference voltage signal VBS supplied to the electrode 612 changes. As a result, the piezoelectric element 60 is driven so that the central portion thereof is displaced in the vertical direction.

The vibration plate 621 is located below the piezoelectric element 60 in FIG. 3. In other words, the piezoelectric element 60 is formed on a surface of the vibration plate 621, the surface being located at an upper side in FIG. 3. Such a vibration plate 621 is displaced in the vertical direction due to the drive of the piezoelectric element 60 in the vertical direction.

The cavity 631 is located at a lower side of the vibration plate 621 in FIG. 3. The ink is supplied to the cavity 631 from the reservoir 641. Further, the ink stored in the ink container 5 is introduced into the reservoir 641 via the supply port 661. That is, the inside of the cavity 631 is filled with the ink stored in the ink container 5. The internal volume of such a cavity 631 expands or contracts due to the displacement in the vertical direction of the vibration plate 621. That is, the vibration plate 621 functions as a diaphragm that changes the internal volume of the cavity 631, and the cavity 631 functions as a pressure chamber the pressure of which changes due to the displacement in the vertical direction of the vibration plate 621.

The nozzle 651 is an opening provided to the nozzle plate 632 and communicates with the cavity 631. When the internal volume of the cavity 631 changes, the ink that fills the inside of the cavity 631 is ejected from the nozzle 651 in accordance with the change in the internal volume.

In the ejection unit 600 configured as described above, when the piezoelectric element 60 is driven to bend upward, the vibration plate 621 is displaced upward. Thus, the internal volume of the cavity 631 expands, and as a result, the ink stored in the reservoir 641 is drawn into the cavity 631. On the other hand, when the piezoelectric element 60 is driven to bend downward, the vibration plate 621 is displaced downward. Thus, the internal volume of the cavity 631 contracts, and as a result, a corresponding amount of ink to the degree of the contraction of the internal volume of the cavity 631 is ejected from the nozzle 651.

It should be noted that the structure of the piezoelectric element 60 is not limited to the structure shown in FIG. 3 as long as the piezoelectric element 60 is driven by being supplied with the drive voltage VOUT corresponding to the drive signal COM, and can eject the ink from the nozzle 651 by being driven in that structure.

3 Functional Configuration and Operation of Drive Circuit

3.1 Signal Waveform of Drive Signal COM

Figure 4:
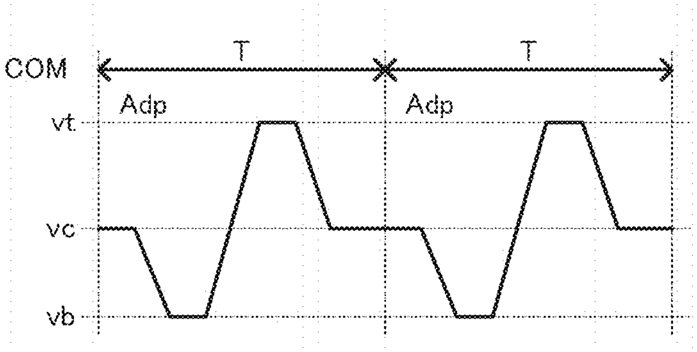
FIG. 4 is a diagram illustrating an example of a signal waveform of a drive signal COM.

Then, a configuration and an operation of the drive circuit 50 will be described. In describing the configuration and the operation of the drive circuit 50, first, an example of the signal waveform of the drive signal COM output by the drive circuit 50 will be described. FIG. 4 is a diagram illustrating an example of the signal waveform of the drive signal COM. As illustrated in FIG. 4, the drive signal COM includes a trapezoidal waveform Adp for each period T. The trapezoidal waveform Adp includes a period in which the drive signal COM is constant at a voltage vc, a period which follows the period in which the drive signal COM is constant at the voltage vc, and in which the drive signal COM is constant at a voltage vb lower than the voltage vc, a period which follows the period in which the drive signal COM is constant at the voltage vb, and in which the drive signal COM is constant at a voltage vt higher than the voltage vc, and a period which follows the period in which the drive signal COM is constant at the voltage vt, and in which the drive signal COM is constant at the voltage VC.

The voltage vc corresponds to a potential serving as a reference for the displacement of the piezoelectric element 60. Then, by the voltage of the drive signal COM supplied to the piezoelectric element 60 changing from the voltage vc to the voltage vb, the piezoelectric element 60 is driven upward in FIG. 3. As a result, the vibration plate 621 is displaced upward in FIG. 3. Then, when the vibration plate 621 is displaced upward in FIG. 3, the internal volume of the cavity 631 expands, and the ink is drawn into the cavity 631 from the reservoir 641. Subsequently, the voltage of the drive signal COM supplied to the piezoelectric element 60 changes from the voltage vb to the voltage vt to thereby drive the piezoelectric element 60 downward in FIG. 3. As a result, the vibration plate 621 is displaced downward in FIG. 3. When the vibration plate 621 is displaced downward in FIG. 3, the internal volume of the cavity 631 contracts, and the ink stored in the cavity 631 is ejected from the nozzle 651.

Further, in some cases, the ink or the vibration plate 621 in the vicinity of the nozzle 651 may continue to vibrate for a certain period of time after the ink is ejected from the nozzle 651 due to the drive of the piezoelectric element 60. The period in which the drive signal COM is constant at the voltage vc provided to the drive signal COM also functions as a period for stopping such a vibration that is generated in the ink or the vibration plate 621, and that does not make a contribution to the ejection of the ink.

Here, the signal waveform of the drive signal COM illustrated in FIG. 4 is illustrative only, and is not a limitation, and may include signal waveforms of various shapes depending on the physical properties of the ink ejected by the print head 21, the length of the period T of the drive signal COM, the conveyance speed of the medium P, and so on. The drive circuits 50-1 to 50-7 may output drive signals COM1 to COM7 including respective signal waveforms different from each other.

3.2 Configuration of Drive Circuit

Figure 5:
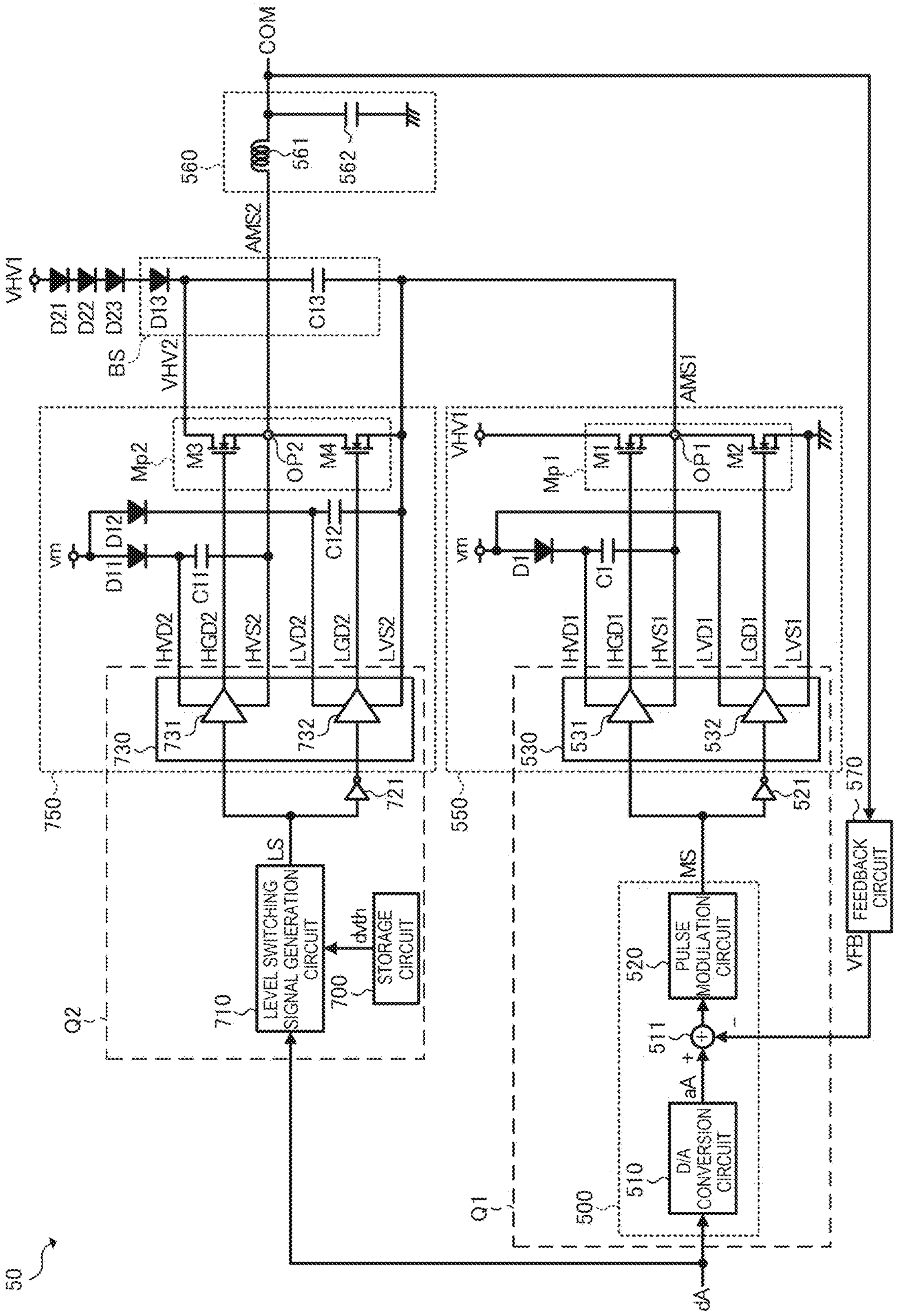
FIG. 5 is a diagram illustrating an example of a functional configuration of a drive circuit.

Then, the configuration of the drive circuit 50 will be described. FIG. 5 is a diagram illustrating an example of a functional configuration of the drive circuit 50. As illustrated in FIG. 5, the drive circuit 50 includes a DA conversion circuit 510, an adder 511, a pulse modulation circuit 520, an inverter 521, an amplifier circuit 550, a demodulation circuit 560, a feedback circuit 570, a storage circuit 700, a level switching signal generation circuit 710, a level shift circuit 750, and a bootstrap circuit BS.

The base drive signal dA, which is a digital signal, is input from the control circuit 100 to the DA conversion circuit 510. The DA conversion circuit 510 performs digital-to-analog conversion on the base drive signal dA, and then outputs the analog signal thus converted as a base drive signal aA. The voltage amplitude of the base drive signal aA is, for example, 1 to 2 V, and the drive circuit 50 outputs a signal obtained by amplifying the base drive signal aA as the drive signal COM. That is, the base drive signal aA corresponds to a target signal of the drive signal COM having not been amplified.

The base drive signal aA is input to a positive input terminal of the adder 511. The feedback signal VFB that is the drive signal COM fed back via the feedback circuit 570 described later is input to a negative input terminal of the adder 511. Then, the adder 511 outputs a signal obtained by subtracting the feedback signal VFB from the base drive signal aA to the pulse modulation circuit 520.

The pulse modulation circuit 520 performs the pulse modulation on a signal output by the adder 511 to thereby generate a modulation signal MS. The modulation signal MS is a digital signal including a potential at an L level and a potential at an H level higher than the L level. Then, the pulse modulation circuit 520 outputs the modulation signal MS thus generated to the amplifier circuit 550. Such a pulse modulation circuit 520 generates a pulse density modulation signal (PDM signal) obtained by modulating the signal output by the adder 511 with a pulse density modulation (PDM:Pulse Density Modulation) method, and then outputs the PDM signal as a modulation signal MS to the amplifier circuit 550. Specifically, the pulse modulation circuit 520 compares the voltage of the output signal of the adder 511 with a predetermined reference voltage. Then, the pulse modulation circuit 520 generates and outputs the modulation signal MS that becomes the H level when the voltage of the output signal of the adder 511 is higher than the reference voltage, and that becomes the L level when the voltage of the output signal of the adder 511 is lower than the reference voltage.

As described above, a circuit formed of the DA conversion circuit 510, the adder 511, and the pulse modulation circuit 520 functions as a modulation circuit 500 that modulates the base drive signal dA as a basis of the drive signal COM and outputs the modulation signal MS.

The amplifier circuit 550 includes a gate drive circuit 530, a diode D1, a capacitor C1, and transistors M1, M2. The amplifier circuit 550 generates a first amplified modulation signal AMS1 obtained by amplifying the modulation signal MS, and outputs the first amplified modulation signal AMS1 from a first output point OP1.

The gate drive circuit 530 outputs a gate signal HGD1 and a gate signal LGD1 based on the modulation signal MS. Specifically, the modulation signal MS is input to a gate driver 531 provided to the gate drive circuit 530. The gate driver 531 generates the gate signal HGD1 obtained by shifting the level of the modulation signal MS input thereto, and then outputs the gate signal HGD1 to the transistor M1. Further, after the logic level of the modulation signal MS is inverted in the inverter 521, the modulation signal MS is input to a gate driver 532 provided to the gate drive circuit 530. The gate driver 532 generates a gate signal LGD1 obtained by shifting the level of a signal obtained by inverting the logic level of the modulation signal MS input thereto, and then outputs the gate signal LGD1 to the transistor M2.

The transistors M1, M2 are both formed of N-channel FETs. The transistor M1 operates based on the gate signal HGD1 input to the gate terminal. A drain terminal as one end of the transistor M1 is supplied with a voltage signal VHV1 having a voltage value of the voltage vhv1 as a power supply voltage. A source terminal as the other end of the transistor M1 is electrically coupled to the first output point OP1. The transistor M2 operates based on the gate signal LGD1 input to the gate terminal. A source terminal as one end of the transistor M2 is supplied with a ground potential. A drain terminal as the other end of the transistor M2 is electrically coupled to the first output point OP1. The transistor M1 and the transistor M2 configure a transistor pair Mp1. That is, the transistor pair Mp1 includes the transistor M1 and the transistor M2, and the transistors M1, M2 are formed of the FETs.

The gate drive circuit 530 includes the gate drivers 531, 532. As described above, the modulation signal MS is input to the gate driver 531, and the signal obtained by inverting the logic level of the modulation signal MS by the inverter 521 is input to the gate driver 532. That is, the signal input to the gate driver 531 and the signal input to the gate driver 532 are exclusively at the H level. Here, the fact that signals are exclusively at the H level includes that signals at the H level are not input simultaneously to the gate driver 531 and the gate driver 532. That is, it does not exclude when signals at the L level are simultaneously input to the gate driver 531 and the gate driver 532.

A power supply terminal at the low potential side of the gate driver 531 is electrically coupled to the first output point OP1. Therefore, the power supply terminal at the low potential side of the gate driver 531 is supplied with a signal generated at the first output point OP1 as a voltage signal HVS1. Further, a power supply terminal at the high potential side of the gate driver 531 is electrically coupled to a cathode terminal of the diode D1 and one end of the capacitor C1. An anode terminal of the diode D1 is supplied with a voltage vm, and the other end of the capacitor C1 is electrically coupled to the first output point OP1. That is, the diode D1 and the capacitor C1 configure a bootstrap circuit, and an output voltage of that bootstrap circuit is supplied to the power supply terminal at the high potential side of the gate driver 531.

Therefore, the power supply terminal at the high potential side of the gate driver 531 is supplied with a voltage signal HVD1 higher in voltage by the voltage vm than the voltage signal HVS1 input to the power supply terminal at the low potential side of the gate driver 531. Then, the gate driver 531 outputs the gate signal HGD1 having the voltage based on the voltage signal HVD1 having the voltage higher by the voltage vm than the voltage of the first output point OP1 when the modulation signal MS at the H level is input, and outputs the gate signal HGD1 having the voltage based on the voltage signal HVS1 as the voltage of the first output point OP1 when the modulation signal MS at the L level is input. Here, the voltage vm is a voltage value capable of driving the transistors M1, M2 and the transistors M3, M4 described later, and is, for example, a DC voltage of 7.5 V.

A power supply terminal at the low potential side of the gate driver 532 is supplied with a signal of the ground potential as a voltage signal LVS1. Further, a power supply terminal at the high potential side of the gate driver 532 is supplied with the voltage vm as the voltage signal LVD1. Accordingly, the gate driver 532 outputs the gate signal LGD1 having a voltage based on the voltage signal LVD1 of the voltage vm when the signal at the H level obtained by inverting the logic level of the modulation signal at the L level with the inverter 521 is input, and outputs the gate signal LGD1 having the voltage based on the voltage signal LVS1 of the ground potential when the signal at the L level obtained by inverting the logic level of the modulation signal MS at the H level with the inverter 521 is input.

Then, by the transistor M1 operating based on the gate signal HGD1, and the transistor M2 operating based on the gate signal LGD1, the first amplified modulation signal AMS1 obtained by amplifying the modulation signal MS with the voltage vhv1 is generated at the first output point OP1. The first amplified modulation signal AMS1 generated at the first output point OP1 of the transistor pair Mp1 is output from the amplifier circuit 550.

Here, the modulation circuit 500 including the DA conversion circuit 510, the adder 511, and the pulse modulation circuit 520, and the gate drive circuit 530 including the gate drivers 531, 532 are configured as an integrated circuit Q1 that is a single semiconductor device.

The base drive signal dA, which is a digital signal, is input from the control circuit 100 to the level switching signal generation circuit 710. The level switching signal generation circuit 710 generates a level switching signal LS including a potential at the L level and a potential at the H level higher than the L level based on the base drive signal dA, and then outputs the level switching signal LS. Specifically, when the value of the base drive signal dA increases to a value higher than a threshold value dvth when the level switching signal LS is at the L level, the level switching signal generation circuit 710 switches the logic level of the level switching signal LS from the L level to the H level. Further, when the value of the base drive signal dA decreases to a value lower than the threshold value dvth when the level switching signal LS is at the H level, the level switching signal generation circuit 710 switches the logic level of the level switching signal LS from the H level to the L level.

The threshold value dvth is stored in the storage circuit 700. The storage circuit 700 may be, for example, a non-volatile memory device. Further, the storage circuit 700 may be a volatile memory device, and the threshold value dvth may be set in the storage circuit 700 by external communication from the control circuit 100 or the like. That is, the threshold value dvth may be a predetermined value or may be rewritable from the outside of the drive circuit 50.

The level shift circuit 750 includes a gate drive circuit 730, diodes D11, D12, capacitors C11, C12, and transistors M3, M4. Further, the level shift circuit 750 outputs the first amplified modulation signal AMS1 output by the amplifier circuit 550 or a signal obtained by shifting a reference potential of the first amplified modulation signal AMS1 output by the amplifier circuit 550 from a second output point OP2 as a second amplified modulation signal AMS2.

The gate drive circuit 730 outputs the gate signal HGD2 and the gate signal LGD2 based on the level switching signal LS. Specifically, the level switching signal LS is input to a gate driver 731 provided to the gate drive circuit 730. The gate driver 731 generates a gate signal HGD2 obtained by shifting the level of the level switching signal LS, and then outputs the gate signal HGD2 to the transistor M3. Further, the logic level of the level switching signal LS is inverted in the inverter 721, and then the level switching signal LS is input to a gate driver 732 provided to the gate drive circuit 730. The gate driver 732 generates a gate signal LGD2 obtained by shifting the level of a signal obtained by inverting the logic level of the level switching signal LS input thereto, and then outputs the gate signal LGD2 to the transistor M4.

The transistors M3, M4 are both formed of N-channel FETs. The transistor M3 operates based on the gate signal HGD2 input to the gate terminal. A drain terminal as one end of the transistor M3 is supplied with a voltage signal VHV2 having a voltage value of the voltage vhv2 output from the bootstrap circuit BS described later as a power supply voltage. A source terminal as the other end of the transistor M3 is electrically coupled to the second output point OP2. The transistor M4 operates based on the gate signal LGD2 input to the gate terminal. A source terminal as one end of the transistor M4 is supplied with the first amplified modulation signal AMS1. A drain terminal as the other end of the transistor M4 is electrically coupled to the second output point OP2. The transistor M3 and the transistor M4 constitute a transistor pair Mp2. That is, the transistor pair Mp2 includes the transistor M3 and the transistor M4, and the transistors M3, M4 are formed of FETs.

The gate drive circuit 730 includes the gate drivers 731, 732. As described above, the level switching signal LS is input to the gate driver 731, and the signal obtained by inverting the logic level of the level switching signal LS by the inverter 721 is input to the gate driver 732. That is, the signal input to the gate driver 731 and the signal input to the gate driver 732 are exclusively at the H level. Here, the fact that signals are exclusively at the H level includes that signals at the H level are not input simultaneously to the gate driver 731 and the gate driver 732. That is, it does not exclude when signals at the L level are simultaneously input to the gate driver 731 and the gate driver 732.

A power supply terminal at the low potential side of the gate driver 731 is electrically coupled to the second output point OP2. Therefore, the power supply terminal at the low potential side of the gate driver 731 is supplied with a signal generated at the second output point OP2 as a voltage signal HVS2. Further, a power supply terminal at the high potential side of the gate driver 731 is electrically coupled to a cathode terminal of the diode D11 and one end of the capacitor C11. An anode terminal of the diode D11 is supplied with a voltage vm, and the other end of the capacitor C11 is electrically coupled to the second output point OP2. That is, the diode D11 and the capacitor C11 configure a bootstrap circuit, and an output voltage of that bootstrap circuit is supplied to the power supply terminal at the high potential side of the gate driver 731.

Therefore, the power supply terminal at the high potential side of the gate driver 731 is supplied with a voltage signal HVD2 higher in voltage by the voltage vm than the voltage signal HVS2 input to the power supply terminal at the low potential side of the gate driver 731. Then, the gate driver 731 outputs the gate signal HGD2 having the voltage based on the voltage signal HVD2 having the voltage higher by the voltage vm than the voltage of the second output point OP2 when the level switching signal LS at the H level is input, and outputs the gate signal HGD2 having the voltage based on the voltage signal HVS2 as the voltage of the second output point OP2 when the level switching signal LS at the L level is input.

A power supply terminal at the low potential side of the gate driver 732 is electrically coupled to the second output point OP1. Therefore, the power supply terminal at the low potential side of the gate driver 732 is supplied with the first amplified modulation signal AMS1 generated at the first output point OP1 as the voltage signal LVS2. Further, a power supply terminal at the high potential side of the gate driver 732 is electrically coupled to a cathode terminal of the diode D12 and one end of the capacitor C12. An anode terminal of the diode D12 is supplied with a voltage vm, and the other end of the capacitor C12 is electrically coupled to the first output point OP1. That is, the diode D12 and the capacitor C12 configure a bootstrap circuit, and an output voltage of that bootstrap circuit is supplied to the power supply terminal at the high potential side of the gate driver 732.

Therefore, the power supply terminal at the high potential side of the gate driver 732 is supplied with a voltage signal LVD2 higher in voltage by the voltage vm than the voltage signal LVS2 input to the power supply terminal at the low potential side of the gate driver 732. Then, the gate driver 732 outputs the gate signal LGD2 having a voltage value based on the voltage signal LVD2 having a voltage higher by the voltage vm than the voltage at the first output point OP1 when a signal at the H level obtained by inverting the logic level of the level switching signal LS at the L level by the inverter 721 is input, and outputs the gate signal HGD2 having a voltage based on the voltage signal LVS2 having the voltage at the first output point OP1 when a signal at the L level obtained by inverting the logic level of the level switching signal LS at the H level by the inverter 721 is input.

Then, by the transistor M3 operating based on the gate signal HGD2 and the transistor M4 operating based on the gate signal LGD2, the first amplified modulation signal AMS1 or a signal obtained by shifting the reference potential of the first amplified modulation signal AMS1 is generated as the second amplified modulation signal AMS2 at the second output point OP2. Then, the second amplified modulation signal AMS2 generated at the second output point OP2 of the transistor pair Mp2 is output from the level shift circuit 750.

The bootstrap circuit BS includes a diode D13 and a capacitor C13. One end of the capacitor C13 is electrically coupled to the first output point OP1, and the other end thereof is electrically coupled to the drain terminal of the transistor M3. An anode terminal of the diode D13 is supplied with the voltage signal VHV1 via diodes D21, D22, and D23. A cathode terminal of the diode D13 is electrically coupled to the other end of the capacitor C13 and the drain terminal of the transistor M3. Therefore, the bootstrap circuit BS outputs a voltage signal VHV2 obtained by shifting the reference potential of the first amplified modulation signal AMS1 output to the first output point OP1 by a voltage value obtained by subtracting the sum of a forward drop voltage Vf1 of the diode D13, a forward drop voltage Vf2 of the diode D21, a forward drop voltage Vf3 of the diode D22, and a forward drop voltage Vf4 of the diode D23 from the voltage vhv1 which is the voltage value of the voltage signal VHV1.

Therefore, when the level switching signal generation circuit 710 outputs the level switching signal LS at the L level, the level shift circuit 750 outputs the first amplified modulation signal AMS1 output to the first output point OP1 of the amplifier circuit 550 from the second output point OP2 as the second amplified modulation signal AMS2. On the other hand, when the level switching signal generation circuit 710 outputs the level switching signal LS at the H level, the level shift circuit 750 outputs the voltage signal VHV2, which is obtained by shifting the reference potential of the first amplified modulation signal AMS1 output to the first output point OP1 of the amplifier circuit 550 by the voltage value obtained by subtracting the voltage value of the sum of the forward drop voltages Vf1, Vf2, Vf3, and Vf4 from the voltage signal VHV1, from the second output point OP2 as the second amplified modulation signal AMS2.

As described above, the bootstrap circuit BS includes the capacitor C13 and the diode D13, shifts the level of the voltage value of the voltage signal VHV1, which is the power supply voltage supplied to the transistor pair Mp1 including the transistors M1, M2 provided to the amplifier circuit 550, in accordance with the first amplified modulation signal AMS1, and then supplies the result to the transistor pair Mp2. Then, the drain terminal, which is one end of the transistor M3, is electrically coupled to the bootstrap circuit BS, the source terminal, which is one end of the transistor M4, is supplied with the first amplified modulation signal AMS1, and the other end of the transistor M3 and the other end of the transistor M4 are electrically coupled to each other at the second output point OP2, whereby the second amplified modulation signal AMS2 is output from the second output point OP2.

Here, in the following description, an operation mode in which the level shift circuit 750 outputs the first amplified modulation signal AMS1 as the second amplified modulation signal AMS2 is referred to as a first mode MD1, and an operation mode in which the signal obtained by shifting the reference potential of the first amplified modulation signal AMS1 is output as the second amplified modulation signal AMS2 is referred to as a second mode MD2. That is, the level shift circuit 750 enters the first mode MD1 when the level switching signal LS is at the L level, and enters the second mode MD2 when the level switching signal LS is at the H level.

For example, when the voltage value defined by the base drive signal dA is lower than the threshold value dvth, the level switching signal generation circuit 710 outputs the level switching signal LS at the L level. Accordingly, the level shift circuit 750 operates in the first mode MD1. Subsequently, by the voltage value defined by the base drive signal dA exceeding the threshold value dvth, the level switching signal generation circuit 710 switches the level switching signal LS from the L level to the H level. Accordingly, the operation mode of the level shift circuit 750 is switched from the first mode MD1 to the second mode MD2. Further, when the voltage value defined by the base drive signal dA is higher than the threshold value dvth, the level switching signal generation circuit 710 outputs the level switching signal LS at the H level. Accordingly, the level shift circuit 750 operates in the second mode MD2. Subsequently, by the voltage value defined by the base drive signal dA becoming lower than the threshold value dvth, the level switching signal generation circuit 710 switches the level switching signal LS from the H level to the L level. Accordingly, the operation mode of the level shift circuit 750 is switched from the second mode MD2 to the first mode MD1.

The level switching signal generation circuit 710 in the present embodiment outputs, as the level switching signal LS, a pulse signal that becomes the L level in a short period of time once or a plurality of times Immediately after the level switching signal generation circuit 710 switches the level switching signal LS from the L level to the H level. Further, the level switching signal generation circuit 710 in the present embodiment outputs, as the level switching signal LS, a pulse signal that becomes the H level in a short period of time once or a plurality of times Immediately after the level switching signal generation circuit 710 switches the level switching signal LS from the H level to the L level. This reduces the possibility that a distortion occurs in the signal waveform of the drive signal COM due to the switching between the operation modes of the level shift circuit 750.

Here, in the following description, a pulse signal that becomes the L level in a short period of time when the operation mode of the level shift circuit 750 is switched from the first mode MD1 to the second mode MD2, and a pulse signal that becomes the H level in a short period of time when the operation mode of the level shift circuit 750 is switched from the second mode MD2 to the first mode MD1 are each referred to as a counter pulse CP in some cases. Further, in the liquid ejection apparatus 1 according to the present embodiment, the storage circuit 700, the level switching signal generation circuit 710, and the gate drive circuit 730 including the gate drivers 731, 732 are configured as an integrated circuit Q2 that is a single semiconductor device.

The second amplified modulation signal AMS2 output by the level shift circuit 750 is input to the demodulation circuit 560. The demodulation circuit 560 smooths the second amplified modulation signal AMS2 output by the level shift circuit 750 to thereby demodulate the second amplified modulation signal AMS2, and then outputs the drive signal COM.

The demodulation circuit 560 includes an inductor 561 and a capacitor 562. One end of the inductor 561 is electrically coupled to the second output point OP2. The other end of the inductor 561 is electrically coupled to one end of the capacitor 562. Further, the ground potential is supplied to the other end of the capacitor 562. That is, the inductor 561 and the capacitor 562 configure a low-pass filter circuit. The second amplified modulation signal AMS2 output from the level shift circuit 750 is smoothed by this low-pass filter circuit, and is output from the drive circuit 50 as the drive signal COM.

The drive signal COM generated by the demodulation circuit 560 is input to the feedback circuit 570. The feedback circuit 570 generates a feedback signal VFB corresponding to the drive signal COM input thereto, and then outputs the feedback signal VFB to the modulation circuit 500. Specifically, the feedback circuit 570 supplies the feedback signal VFB obtained by performing the voltage division on the drive signal COM to the adder 511. Thus, the drive signal COM is fed back to the pulse modulation circuit 520. As a result, the waveform accuracy of the drive signal COM output by the drive circuit 50 is improved. Here, the feedback circuit 570 may feed back a plurality of signals including a signal obtained by performing the voltage division on the drive signal COM and a signal obtained by extracting a high-frequency component of the drive signal COM as the feedback signal VFB. That is, the feedback circuit 570 may include a plurality of feedback circuits including a circuit that feeds back a signal obtained by performing the voltage division on the drive signal COM and a circuit that feeds back a signal obtained by extracting the high-frequency component of the drive signal COM. Thus, the high-frequency components provided to the drive signal COM can be fed back individually. As a result, it becomes possible for the drive circuit 50 to self-oscillate based on that high-frequency component, and the frequency of the modulation signal MS can be made high enough to ensure the accuracy of the drive signal COM. Therefore, the waveform accuracy of the drive signal COM output from the drive circuit 50 is further improved.

While the frequency of the drive signal COM output by the drive circuit 50 configured as described above is several tens of kHz, the signal having the frequency of several MHz is used as the gate signals HGD1, LGD1 output by the gate drive circuit 530 from a viewpoint of accurately generating the signal waveform of the drive signal COM. On the other hand, the gate signals HGD2, LGD2 output by the gate drive circuit 730 are signals the logic level of which changes several times in the period T in which the drive signal COM is generated, and therefore, the frequency of the gate signals HGD2, LGD2 are several times as high as the frequency of the drive signal COM, and are, for example, signals with several tens of kHz to several hundreds of kHz. That is, the gate signals HGD1, LGD1 are higher in frequency than the gate signals HGD2, LGD2. Thus, a switching loss in the transistors M3, M4 is reduced.

As described above, the drive circuit 50 in the present embodiment includes the amplifier circuit 550 including the gate drive circuit 530 that outputs the gate signals HGD1, LGD1 according to the base drive signal dA, and the transistor pair Mp1 that includes the transistor M1 driven in accordance with the gate signal HGD1, and the transistor M2 driven in accordance with the gate signal LGD1, and outputs the first amplified modulation signal AMS1 in accordance with the gate signals HGD1, LGD1, the level shift circuit 750 including the gate drive circuit 730 that outputs the gate signals HGD2, LGD2 according to the base drive signal dA, and the transistor pair Mp2 that includes the transistor M3 driven in accordance with the gate signal HGD2, and the transistor M4 driven in accordance with the gate signal LGD2, and outputs the second amplified modulation signal AMS2 in accordance with the first amplified modulation signal AMS1, and the demodulation circuit 560 that smooths the second amplified modulation signal AMS2 to thereby demodulate the second amplified modulation signal AMS2, and then outputs the result as the drive signal COM.

That is, in the drive circuit 50 in the present embodiment, the modulation circuit 500 includes a DA conversion circuit 510 that converts the base drive signal dA into the base drive signal aA as an analog signal, and a pulse modulation circuit 520 that outputs the modulation signal MS obtained by modulating the base drive signal aA. Further, the modulation circuit 500 and the amplifier circuit 550 output the first amplified modulation signal AMS1 obtained by amplifying the modulation signal MS based on the base drive signal dA, and the level shift circuit 750 outputs the second amplified modulation signal AMS2 obtained by shifting the reference potential of the first amplified modulation signal AMS1 based on the base drive signal dA. Then, the demodulation circuit 560 smooths to demodulate the second amplified modulation signal AMS2 to thereby output the drive signal COM.

In the drive circuit 50 configured as described above, the voltage value of the voltage signal VHV1 as the power supply voltage supplied to the transistors M1, M2 can be reduced. Therefore, the switching loss in the transistors M1, M2 is reduced. As a result, the power consumption in the drive circuit 50 can be reduced compared to when the drive circuit 50 is configured with an AB-class amplifier circuit or a typical D-class amplifier circuit.

3.3 Operation of Drive Circuit

Figure 6:
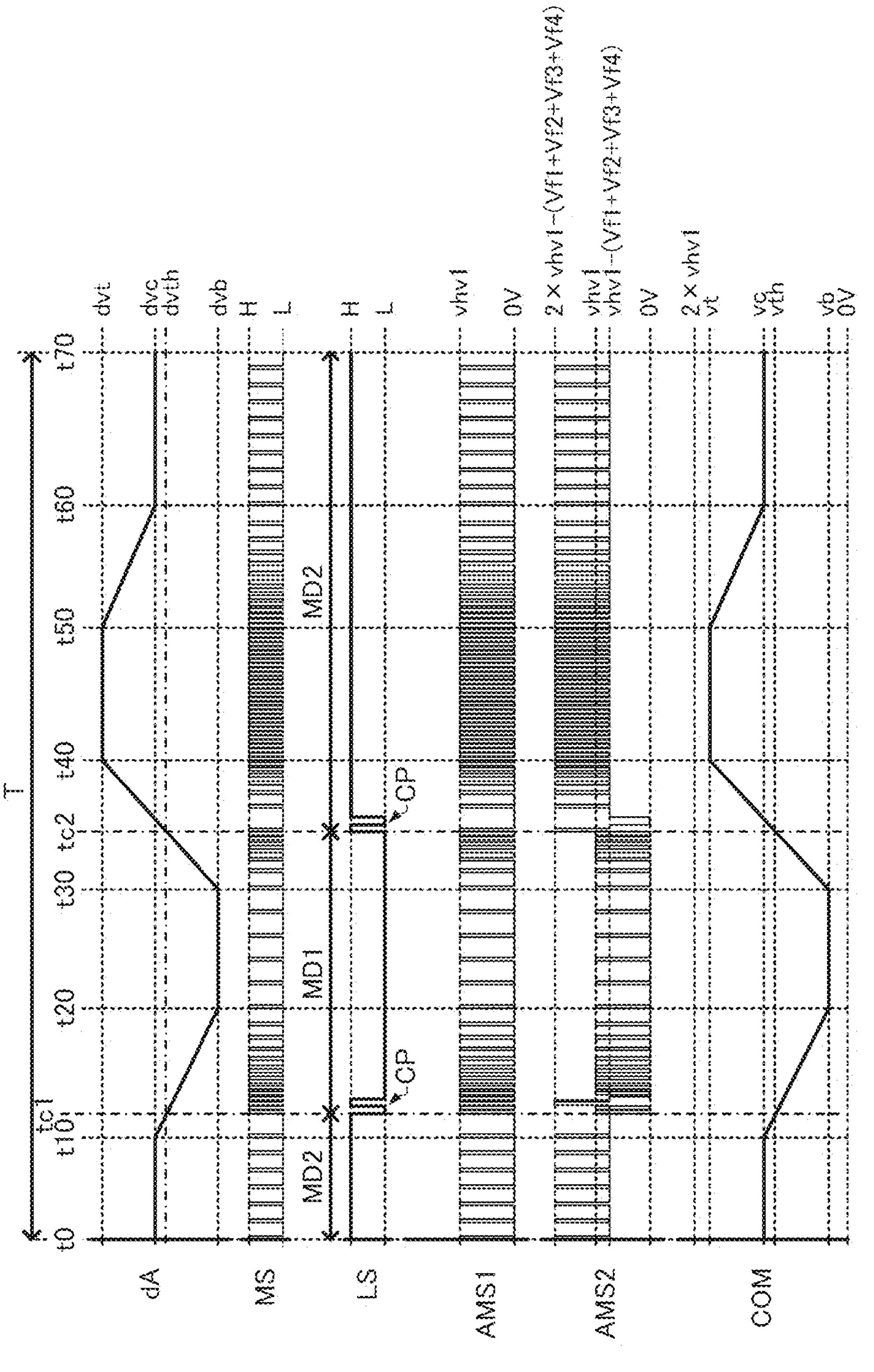
FIG. 6 is a diagram illustrating an operation of the drive circuit.

Then, the operation of the drive circuit 50 will be described. FIG. 6 is a diagram illustrating an operation of the drive circuit 50. Note that in FIG. 6, only the drive signal COM in any period T is illustrated out of the drive signals COM output by the drive circuit 50.

As illustrated in FIG. 6, during a period from time t0 to time t10, the base drive signal dA having a digital value dvc is input to the DA conversion circuit 510. On this occasion, the drive circuit 50 outputs the drive signal COM with the voltage vc. Since the digital value dvc is higher than the threshold value dvth, the level switching signal generation circuit 710 outputs the level switching signal LS at the H level. As a result, the operation mode of the level shift circuit 750 becomes the second mode MD2, and the level shift circuit 750 outputs the second amplified modulation signal AMS2 obtained by shifting the reference potential of the first amplified modulation signal AMS1.

During a period from the time t10 to time t20, the base drive signal dA decreasing from the digital value dvc to a digital value dvb is input to the DA conversion circuit 510. On this occasion, the drive circuit 50 outputs the drive signal COM that drops from the voltage vc to the voltage vb. Further, when a value defined by the base drive signal dA falls below the threshold value dvth at time tc1 within the period from the time t10 to the time t20, the level switching signal generation circuit 710 outputs the counter pulse CP a predetermined number of times and then switches the logic level of the level switching signal LS from the H level to the L level. Thus, the operation mode of the level shift circuit 750 makes the transition from the second mode MD2 to the first mode MD1. Accordingly, the level shift circuit 750 outputs the second amplified modulation signal AMS2 obtained by shifting the reference potential of the first amplified modulation signal AMS1 in the period from the time t10 to the time tc1, and then outputs the first amplified modulation signal AMS1 as the second amplified modulation signal AMS2 in the period from the time tc1 to the time t20.

During the period from the time t20 to time t30, the base drive signal dA with the digital value dvb is input to the DA conversion circuit 510. On this occasion, the drive circuit 50 outputs the drive signal COM with the voltage vb. Since the digital value dvb is lower than the threshold value dvth, the level switching signal generation circuit 710 outputs the level switching signal LS at the L level. As a result, the operation mode of the level shift circuit 750 is kept in the first mode MD1, and the level shift circuit 750 outputs the first amplified modulation signal AMS1 as the second amplified modulation signal AMS2.

During a period from the time t30 to time t40, the base drive signal dA increasing from the digital value dvb to a digital value dvt is input to the DA conversion circuit 510. On this occasion, the drive circuit 50 outputs the drive signal COM that rises from the voltage vb to the voltage vt. Further, when a value defined by the base drive signal dA exceeds the threshold value dvth at time tc2 within the period from the time t30 to the time t40, the level switching signal generation circuit 710 outputs the counter pulse CP a predetermined number of times and then switches the logic level of the level switching signal LS from the L level to the H level. Thus, the operation mode of the level shift circuit 750 makes the transition from first mode MD1 to the second mode MD2. Accordingly, the level shift circuit 750 outputs the first amplified modulation signal AMS1 as the second amplified modulation signal AMS2 in the period from the time t30 to the time tc2, and then outputs the second amplified modulation signal AMS2 obtained by shifting the reference potential of the first amplified modulation signal AMS1 in the period from the time tc2 to the time t40.

During the period from the time t40 to time t50, the base drive signal dA with the digital value dvt is input to the DA conversion circuit 510. On this occasion, the drive circuit 50 outputs the drive signal COM with the voltage vt. Since the digital value dvt is higher than the threshold value dvth, the level switching signal generation circuit 710 generates the level switching signal LS at the H level. As a result, the operation mode of the level shift circuit 750 is kept in the second mode MD2, and the level shift circuit 750 outputs the signal obtained by shifting the reference potential of the first amplified modulation signal AMS1 as the second amplified modulation signal AMS2.

During a period from the time t50 to time t60, the base drive signal dA decreasing from the digital value dvt to the digital value dvc is input to the DA conversion circuit 510. On this occasion, the drive circuit 50 outputs the drive signal COM that drops from the voltage vt to the voltage vc. During the period from the time t50 to the time t60, since the digital value of the base drive signal dA is higher than the threshold value dvth, the level switching signal generation circuit 710 outputs the level switching signal LS at the H level. Therefore, the operation mode of the level shift circuit 750 is kept in the second mode MD2, and the level shift circuit 750 outputs the signal obtained by shifting the reference potential of the first amplified modulation signal AMS1 as the second amplified modulation signal AMS2.

During the period from the time t60 to time t70, the base drive signal dA with the digital value dvc is input to the DA conversion circuit 510. On this occasion, the drive circuit 50 outputs the drive signal COM with the voltage vc. Since the digital value dvc is higher than the threshold value dvth, the level switching signal generation circuit 710 outputs the level switching signal LS at the H level. As a result, the operation mode of the level shift circuit 750 is kept in the second mode MD2, and the level shift circuit 750 outputs the signal obtained by shifting the reference potential of the first amplified modulation signal AMS1 as the second amplified modulation signal AMS2.

Here, the time t70 corresponds to the time t0 described above. The drive circuit 50 repeats the operations in a period from the time t0 to the time t70 described above every period T to thereby output the drive signal COM having the signal waveform shown in FIG. 4.

4 Configuration of Drive Circuit Board

Then, the structure of the drive circuit board 300 on which various circuits including the drive circuits 50-1 to 50-7 configured as described above are mounted will be described.

Figure 7:
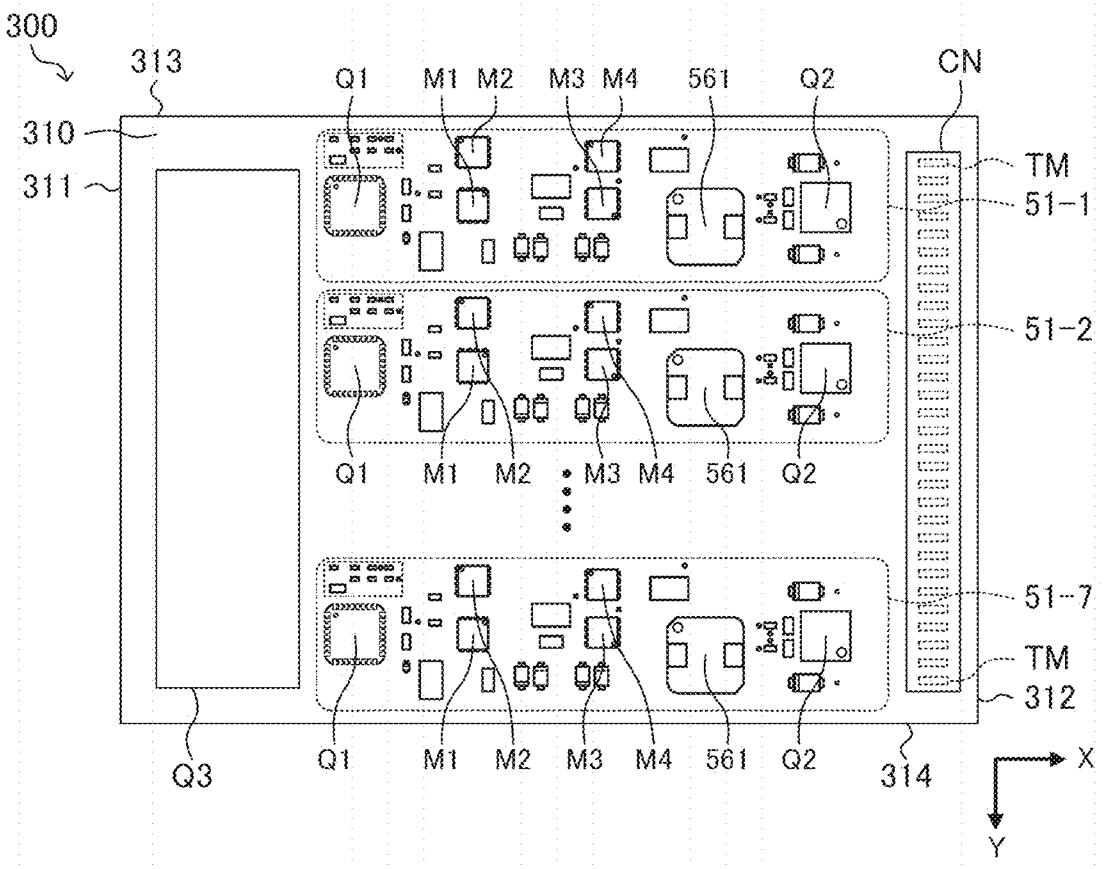
FIG. 7 is a diagram illustrating an example of a structure of a drive circuit board.

FIG. 7 is a diagram illustrating an example of a structure of the drive circuit board 300. Here, in describing the structure of the drive circuit board 300, description will be given using the X axis and the Y axis orthogonal to each other. Further, when defining the direction along the X axis, a base side of the arrow illustrated is referred to as a −X side, a tip side is referred to as a +X side, and when defining the direction along the Y axis, a base side of the arrow illustrated is referred to as a −Y side, and a tip side is referred to as a +Y side.

As illustrated in FIG. 7, the drive circuit board 300 includes a wiring board 310. As the wiring board 310, a glass epoxy board or a glass composite board including a single wiring layer or a plurality of wiring layers can be used. Further, the wiring board 310 includes sides 311, 312, 313, and 314. The side 311 and the side 312 face each other along the X axis such that the side 311 is at the −X side and the side 312 is at the +X side. The side 313 and the side 314 face each other along the Y axis such that the side 313 is at the −Y side and the side 314 is at the +Y side. That is, the wiring board 310 includes the side 311 and the side 312 opposed to each other along a direction from the −X side toward the +X side along the X axis, and the side 313 and the side 314 opposed to each other along a direction from the −Y side toward the +Y side along the Y axis.

Each of the side 311 and the side 312 crosses the side 313 and the side 314. That is, the wiring board 310 in the present embodiment has a substantially rectangular shape. Note that the shape of the wiring board 310 is not limited to a rectangular shape, and may be a polygon such as a pentagon or a hexagon, and may further partially include a cutout or a circular arc.

The wiring board 310 is provided with an integrated circuit Q3, the drive circuits 50-1 to 50-7, and a connector CN.

The integrated circuit Q3 is a semiconductor device including at least a part of the control circuit 100 provided to the control mechanism 10. The integrated circuit Q3 has a function of outputting the base drive signals dA1 to dA7 to at least the drive circuits 50-1 to 50-7, respectively, out of a plurality of functions provided to the control circuit 100.

Drive circuit mounting regions 51-1 to 51-7 are located at the +X side of the integrated circuit Q3. The drive circuit mounting region 51-1 is a substantially rectangular region that is along the side 313 of the wiring board 310, and takes a direction along the X axis as the longitudinal direction, and the drive circuit 50-1 is mounted in the drive circuit mounting region 51-1. The drive circuit mounting region 51-2 is a substantially rectangular region located at the +Y side of the drive circuit mounting region 51-1 and taking a direction along the X axis as the longitudinal direction, and the drive circuit 50-2 is mounted in the drive circuit mounting region 51-2. The drive circuit mounting region 51-3 is a substantially rectangular region located at the +Y side of the drive circuit mounting region 51-2 and taking a direction along the X axis as the longitudinal direction, and the drive circuit 50-3 is mounted in the drive circuit mounting region 51-3. The drive circuit mounting region 51-4 is a substantially rectangular region located at the +Y side of the drive circuit mounting region 51-3 and taking a direction along the X axis as the longitudinal direction, and the drive circuit 50-4 is mounted in the drive circuit mounting region 51-4. The drive circuit mounting region 51-5 is a substantially rectangular region located at the +Y side of the drive circuit mounting region 51-4 and taking a direction along the X axis as the longitudinal direction, and the drive circuit 50-5 is mounted in the drive circuit mounting region 51-5. The drive circuit mounting region 51-6 is a substantially rectangular region located at the +Y side of the drive circuit mounting region 51-5 and taking a direction along the X axis as the longitudinal direction, and the drive circuit 50-6 is mounted in the drive circuit mounting region 51-6. The drive circuit mounting region 51-7 is a substantially rectangular region located at the +Y side of the drive circuit mounting region 51-6 and taking a direction along the X axis as the longitudinal direction, and the drive circuit 50-7 is mounted in the drive circuit mounting region 51-7.

That is, in the wiring board 310, the length in a direction along the X axis of the drive circuit mounting region 51-1 in which the drive circuit 50-1 is disposed is longer than the length in a direction along the Y axis, the length in a direction along the X axis of the drive circuit mounting region 51-2 in which the drive circuit 50-2 is disposed is longer than the length in a direction along the Y axis, the length in a direction along the X axis of the drive circuit mounting region 51-3 in which the drive circuit 50-3 is disposed is longer than the length in a direction along the Y axis, the length in a direction along the X axis of the drive circuit mounting region 51-4 in which the drive circuit 50-4 is disposed is longer than the length in a direction along the Y axis, the length in a direction along the X axis of the drive circuit mounting region 51-5 in which the drive circuit 50-5 is disposed is longer than the length in a direction along the Y axis, the length in a direction along the X axis of the drive circuit mounting region 51-6 in which the drive circuit 50-6 is disposed is longer than the length in a direction along the Y axis, the length in a direction along the X axis of the drive circuit mounting region 51-7 in which the drive circuit 50-7 is disposed is longer than the length in a direction along the Y axis.

Here, the length in the direction along the X axis of each of the drive circuit mounting regions 51-1 to 51-7 may be a distance in the direction along the X axis from the electronic component located at the extreme −X side to the electronic component located at the extreme +X side out of the electronic components constituting the drive circuit 50, and the length in the direction along the Y axis of each of the drive circuit mounting regions 51-1 to 51-7 may be a distance in the direction along the Y axis from the electronic component located at the extreme −Y side to the electronic component located at the extreme +Y side out of the electronic components constituting the drive circuit 50.

As described above, in the wiring board 310, the drive circuits 50-1 to 50-7 are mounted at the +X side of the integrated circuit Q3 along the Y axis from the −Y side to the +Y side in the order of the drive circuit 50-1, the drive circuit 50-2, the drive circuit 50-3, the drive circuit 50-4, the drive circuit 50-5, the drive circuit 50-6, and the drive circuit 50-7. That is, the drive circuits 50-1 to 50-7 are disposed to at least partially overlap when viewed in a direction along the Y axis.

On this occasion, the drive circuit mounting regions 51-1 to 51-7 are each positioned so as to at least partially overlap each other when viewed along the Y axis.

Specifically, the drive circuits 50-1 to 50-7 mounted in the corresponding drive circuit mounting regions 51-1 to 51-7 are located so that the integrated circuit Q1 provided to the drive circuit 50-1, the integrated circuit Q1 provided to the drive circuit 50-2, the integrated circuit Q1 provided to the drive circuit 50-3, the integrated circuit Q1 provided to the drive circuit 50-4, the integrated circuit Q1 provided to the drive circuit 50-5, the integrated circuit Q1 provided to the drive circuit 50-6, and the integrated circuit Q1 provided to the drive circuit 50-7 at least partially overlap each other when viewed along the Y axis, and the integrated circuit Q2 provided to the drive circuit 50-1, the integrated circuit Q2 provided to the drive circuit 50-2, the integrated circuit Q2 provided to the drive circuit 50-3, the integrated circuit Q2 provided to the drive circuit 50-4, the integrated circuit Q2 provided to the drive circuit 50-5, the integrated circuit Q2 provided to the drive circuit 50-6, and the integrated circuit Q2 provided to the drive circuit 50-7 at least partially overlap each other when viewed along the Y axis.

That is, the integrated circuits Q1 provided respectively to the drive circuits 50-1 to 50-7 are disposed to at least partially overlap each other when viewed along the Y axis, and the integrated circuits Q2 provided respectively to the drive circuits 50-1 to 50-7 are disposed to at least partially overlap each other when viewed along the Y axis.

Further, the drive circuits 50-1 to 50-7 mounted in the corresponding drive circuit mounting regions 51-1 to 51-7 are located so that the transistor M1 provided to the drive circuit 50-1, the transistor M1 provided to the drive circuit 50-2, the transistor M1 provided to the drive circuit 50-3, the transistor M1 provided to the drive circuit 50-4, the transistor M1 provided to the drive circuit 50-5, the transistor M1 provided to the drive circuit 50-6, and the transistor M1 provided to the drive circuit 50-7 at least partially overlap each other when viewed along the Y axis, the transistor M2 provided to the drive circuit 50-1, the transistor M2 provided to the drive circuit 50-2, the transistor M2 provided to the drive circuit 50-3, the transistor M2 provided to the drive circuit 50-4, the transistor M2 provided to the drive circuit 50-5, the transistor M2 provided to the drive circuit 50-6, and the transistor M2 provided to the drive circuit 50-7 at least partially overlap each other when viewed along the Y axis, the transistor M3 provided to the drive circuit 50-1, the transistor M3 provided to the drive circuit 50-2, the transistor M3 provided to the drive circuit 50-3, the transistor M3 provided to the drive circuit 50-4, the transistor M3 provided to the drive circuit 50-5, the transistor M3 provided to the drive circuit 50-6, and the transistor M3 provided to the drive circuit 50-7 at least partially overlap each other when viewed along the Y axis, and the transistor M4 provided to the drive circuit 50-1, the transistor M4 provided to the drive circuit 50-2, the transistor M4 provided to the drive circuit 50-3, the transistor M4 provided to the drive circuit 50-4, the transistor M4 provided to the drive circuit 50-5, the transistor M4 provided to the drive circuit 50-6, and the transistor M4 provided to the drive circuit 50-7 at least partially overlap each other when viewed along the Y axis.

That is, the transistors M1 provided respectively to the drive circuits 50-1 to 50-7 are disposed to at least partially overlap each other when viewed along the Y axis, the transistors M2 provided respectively to the drive circuits 50-1 to 50-7 are disposed to at least partially overlap each other when viewed along the Y axis, the transistors M3 provided respectively to the drive circuits 50-1 to 50-7 are disposed to at least partially overlap each other when viewed along the Y axis, and the transistors M4 provided respectively to the drive circuits 50-1 to 50-7 are disposed to at least partially overlap each other when viewed along the Y axis.

Further, the drive circuits 50-1 to 50-7 mounted in the corresponding drive circuit mounting regions 51-1 to 51-7 are located so that the inductor 561 provided to the drive circuit 50-1, the inductor 561 provided to the drive circuit 50-2, the inductor 561 provided to the drive circuit 50-3, the inductor 561 provided to the drive circuit 50-4, the inductor 561 provided to the drive circuit 50-5, the inductor 561 provided to the drive circuit 50-6, and the inductor 561 provided to the drive circuit 50-7 at least partially overlap each other when viewed along the Y axis. That is, the demodulation circuits 560 provided to the respective drive circuits 50-1 to 50-7 are disposed to at least partially overlap each other when viewed along the Y axis.

The connector CN is located at the +X side of the drive circuit mounting regions 51-1 to 51-7 arranged side by side along the Y axis, and at the +X side of the drive circuits 50-1 to 50-7 arranged side by side along the Y axis, such that the plurality of terminals TM is arranged side by side along the Y axis. The connector CN has the plurality of terminals TM. A plurality of signals including the drive signals COM1 to COM7 output by the respective drive circuits 50-1 to 50-7 is input to the plurality of terminals TM provided to the connector CN. Further, a cable for electrically coupling the ejection mechanism 20 and the drive circuit board 300 to each other is coupled to the connector CN. Thus, the plurality of signals including the drive signals COM1 to COM7 respectively output by the drive circuits 50-1 to 50-7 is output to the ejection mechanism 20.

On this occasion, the connector CN is disposed such that the distances from the inductors 561 provided to the respective drive circuits 50-1 to 50-7 arranged side by side along the Y axis are substantially equal to each other. The shortest distance between the inductor 561 provided to the drive circuit 50-1 and the connector CN, the shortest distance between the inductor 561 provided to the drive circuit 50-2 and the connector CN, the shortest distance between the inductor 561 provided to the drive circuit 50-3 and the connector CN, the shortest distance between the inductor 561 provided to the drive circuit 50-4 and the connector CN, the shortest distance between the inductor 561 provided to the drive circuit 50-5 and the connector CN, the shortest distance between the inductor 561 provided to the drive circuit 50-6 and the connector CN, and the shortest distance between the inductor 561 provided to the drive circuit 50-7 and the connector CN are substantially equal to each other.

Further, in the connector, the terminal TM to which the drive signal COM1 is input, the terminal TM to which the drive signal COM2 is input, the terminal TM to which the drive signal COM3 is input, the terminal TM to which the drive signal COM4 is input, the terminal TM to which the drive signal COM5 is input, the terminal TM to which the drive signal COM6 is input, and the terminal TM to which the drive signal COM7 is input are configured so that a path length of a propagation path through which the drive signal COM1 propagates, a path length of a propagation path through which the drive signal COM2 propagates, a path length of a propagation path through which the drive signal COM3 propagates, a path length of a propagation path through which the drive signal COM4 propagates, a path length of a propagation path through which the drive signal COM5 propagates, a path length of a propagation path through which the drive signal COM6 propagates, a path length of a propagation path through which the drive signal COM7 propagates are substantially equal to each other.

That is, the wiring length of the propagation path for electrically coupling the inductor 561 and the connector CN provided to the drive circuit 50-1, the wiring length of the propagation path for electrically coupling the inductor 561 and the connector CN provided to the drive circuit 50-2, the wiring length of the propagation path for electrically coupling the inductor 561 and the connector CN provided to the drive circuit 50-3, the wiring length of the propagation path for electrically coupling the inductor 561 and the connector CN provided to the drive circuit 50-4, the wiring length of the propagation path for electrically coupling the inductor 561 and the connector CN provided to the drive circuit 50-5, the wiring length of the propagation path for electrically coupling the inductor 561 and the connector CN provided to the drive circuit 50-6, and the wiring length of the propagation path for electrically coupling the inductor 561 and the connector CN provided to the drive circuit 50-7 are substantially equal to each other.

This reduces the possibility that variations occur in the signal waveforms of the drive signals COM1 to COM7 input to the corresponding print heads 21-1 to 21-7 due to the influence of the impedance of the propagation path in each of the drive signals COM1 to COM7.

As described above, the drive circuit board 300 that outputs the drive signals COM1 to COM7 for driving the piezoelectric elements 60 as capacitive loads in the present embodiment includes the drive circuit 50-1 that outputs the drive signal COM1 corresponding to the base drive signal dA1, the drive circuit 50-2 that outputs the drive signal COM2 corresponding to the base drive signal dA2, the drive circuit 50-3 that outputs the drive signal COM3 corresponding to the base drive signal dA3, the drive circuit 50-4 that outputs the drive signal COM4 corresponding to the base drive signal dA4, the drive circuit 50-5 that outputs the drive signal COM5 corresponding to the base drive signal dA5, the drive circuit 50-6 that outputs the drive signal COM6 corresponding to the base drive signal dA6, and the drive circuit 50-7 that outputs the drive signal COM7 corresponding to the base drive signal dA7, the integrated circuit Q3 that outputs the base drive signals dA1 to dA7, the connector CN that outputs the drive signals COM1 to COM7, and the wiring board 310 provided with the drive circuits 50-1 to 50-7, the integrated circuit Q3, and the connector CN.

Further, In the wiring board 310, the drive circuit 50-1, the integrated circuit Q3, and the connector CN are disposed along the X axis from the −X side toward the +X side in the order of the integrated circuit Q3, the drive circuit 50-1, and the connector CN, and the drive circuits 50-1 to 50-7 are disposed to at least partially overlap each other when viewed from the direction along the Y axis orthogonal to the X axis.

When the drive circuits 50-1 to 50-7, the integrated circuit Q3, and the connector CN are disposed as described above, the possibility that routing of the wiring pattern in the drive circuit board 300 becomes complicated is reduced. That is, an optimum wiring pattern can be formed on the wiring board 310. Thus, the possibility that the wiring board 310 grows in size due to the routing of the wiring pattern is reduced, it is possible to realize the reduction in size of the drive circuit board 300, and when generating the drive signals COM1 to COM7 based on the base drive signals dA1 to dA7, the possibility that noise is superimposed is reduced, and the waveform accuracy of the signal waveforms of the drive signals COM1 to COM7 is improved.

Then, an example of the arrangement of various components in the drive circuits 50-1 to 50-7 respectively mounted in the drive circuit mounting regions 51-1 to 51-7 will be described. Here, the mounting arrangements of the components of the drive circuits 50-1 to 50-7 in the drive circuit mounting regions 51-1 to 51-7 are substantially the same. Therefore, in the following description, the component arrangement of the drive circuit 50 will be described. On this occasion, the description will be presented assuming that the drive circuit 50 is mounted in the drive circuit mounting region 51 out of the drive circuit mounting regions 51-1 to 51-7.

Figure 8:
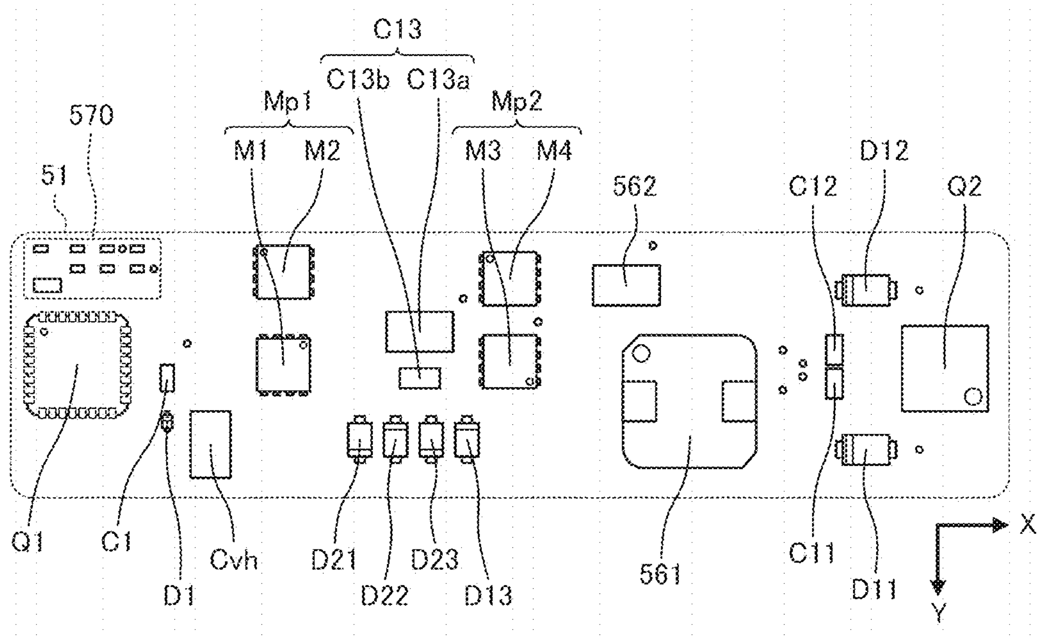
FIG. 8 is a diagram showing an example of a component arrangement of the drive circuit mounted in a drive circuit mounting region.

FIG. 8 is a diagram showing an example of a component arrangement of the drive circuit 50 mounted in the drive circuit mounting region 51. Further, FIG. 8 illustrates the X axis, the Y axis, and the Z axis showing substantially the same directions as those in FIG. 7 described above. Note that the configuration illustrated in FIG. 8 is a part of the configuration of the drive circuit 50, and various components other than those illustrated in FIG. 8 may be mounted on the drive circuit board 300.

As shown in FIG. 8, the integrated circuit Q1 is mounted in an −X side part of the drive circuit mounting region 51 and in a region in the drive circuit mounting region 51 near the integrated circuit Q3.

At the −Y side of the integrated circuit Q1, a plurality of electronic components including one resistive element or a plurality of resistive elements constituting the feedback circuit 570, and one capacitor element or a plurality of capacitor elements are mounted.

The transistors M1, M2 are mounted at the +X side of the integrated circuit Q1. Specifically, the transistor M1 is mounted at the +X side of the integrated circuit Q1, and the transistor M2 is mounted at the +X side of the integrated circuit Q1 and at the −Y side of the transistor M1. That is, the transistor pair Mp1 including the transistor M1 and the transistor M2 is mounted at the +X side of the integrated circuit Q1. On this occasion, the transistors M1, M2 are mounted so as to at least partially overlap each other when viewed along the Y axis. This makes it possible to shorten the difference between the shortest distance between the integrated circuit Q1 and the transistor M1 and the shortest distance between the integrated circuit Q1 and the transistor M2. Therefore, it is possible to reduce the difference between the propagation distance of the gate signal HGD1 input to the transistor M1 and the propagation distance of the gate signal LGD1 input to the transistor M2. In other words, the propagation distance of the gate signal HGD1 input to the transistor M1 and the propagation distance of the gate signal LGD1 input to the transistor M2 can be substantially equal to each other. As a result, a possibility that a variation in operation timing occurs between the transistor M1 and the transistor M2 is reduced, and the driving accuracy of the transistors M1, M2 in accordance with the modulation signal MS is improved. Therefore, the accuracy of the first amplified modulation signal AMS1 output by the amplifier circuit 550 is improved.

Further, when viewed along the Y axis, the capacitor C1 and the diode D1 constituting the bootstrap circuit provided to the amplifier circuit 550 are mounted between the integrated circuit Q1 and the transistor pair Mp1.

Further, a capacitor Cvh (not shown in FIG. 5) is mounted between the integrated circuit Q1 and the transistor pair Mp1 when viewed along the Y axis. One end of the capacitor Cvh is electrically coupled to the wiring pattern propagated by the voltage signal VHV1, and the other end thereof is electrically coupled to the ground potential. The capacitor Cvh functions as a stabilizing capacitor for reducing a possibility that a voltage value fluctuates in the voltage signal VHV1 supplied to the amplifier circuit 550 and the bootstrap circuit BS. That is, the drive circuit 50 includes the capacitor Cvh for stabilizing the voltage signal VHV1 supplied to the transistor pair Mp1 and the transistor pair Mp2. Therefore, the capacitor Cvh preferably has a high capacitance. Therefore, although just one capacitor Cvh is illustrated alone in FIG. 8, the capacitor Cvh may include a plurality of chip capacitors coupled in parallel, or may include an electrolytic capacitor.

The transistors M3, M4 are mounted at the +X side of the transistor pair Mp1.

That is, the transistor pair Mp2 including the transistor M3 and the transistor M4 is mounted at the +X side of the transistor pair Mp1. Specifically, the transistor M3 is mounted at the +X side of the transistor pair Mp1, and the transistor M4 is mounted at the +X side of the transistor pair Mp1 and at the −Y side of the transistor M3. On this occasion, the transistors M3, M4 are mounted so as to at least partially overlap each other when viewed along the Y axis.

Then, when viewed along the Y axis, capacitors C13*a*, C13*b* as the capacitor C13 and diodes D13, D21, D22, and D23 are mounted between the transistor pair Mp1 and the transistor pair Mp2. The capacitor C13*a* is mounted between the transistor pair Mp1 and the transistor pair Mp2. The capacitor C13*b* is mounted between the transistor pair Mp1 and the transistor pair Mp2 and at the +Y side of the capacitor C13*a*. That is, the capacitor C13 including the capacitors C13*a*, C13*b* is disposed between the transistor pair Mp1 and the transistor pair Mp2 and between the transistors M1, M2 and the transistors M3, M4 when viewed from the direction along the Y axis. On this occasion, the capacitor C13*a* and the capacitor C13*b* are electrically coupled in parallel to each other. That is, the bootstrap circuit BS includes the capacitor C13*b* that is electrically coupled in parallel to the capacitor C13*a*. Note that the number of capacitors coupled in parallel in the bootstrap circuit BS is not limited to two, namely the capacitor C13*a* and the capacitor C13*b*, and may be three or more.

Further, the diodes D13, D21, D22, and D23 are mounted at the +Y side of the capacitor C13*b* from the −X side toward the +X side along the X axis in the order of the diode D21, the diode D22, the diode D23, and the diode D13. That is, the bootstrap circuit BS is formed between the transistor pair Mp1 and the transistor pair Mp2.

The inductor 561 and the capacitor 562 are located at the +X side of the transistor pair Mp2. The inductor 561 is mounted at the +X side of the transistor pair Mp2, and the capacitor 562 is mounted at the +X side of the transistor pair Mp2 and at the −Y side of the inductor 561. On this occasion, the capacitor 562 is located so as to at least partially overlap the inductor 561 when viewed along the Y axis. That is, the demodulation circuit 560 is mounted at the +X side of the transistor pair Mp2.

The integrated circuit Q2 is mounted at the +X side of the inductor 561 and the capacitor 562 constituting the demodulation circuit 560. Further, when viewed along the Y axis, the capacitors C11, C12 and the diodes D11, D12 constituting the bootstrap circuit provided to the level shift circuit 750 are located between the integrated circuit Q2, and the inductor 561 and the capacitor 562 constituting the demodulation circuit 560.

As described hereinabove, in the drive circuit board 300, the integrated circuit Q1 including the gate drive circuit 530, the transistor pair Mp1 including the transistors M2, and the demodulation circuit 560 provided to the drive circuit 50 are disposed along the X axis from the −X side toward the +X side in the order of the integrated circuit Q1, the transistor pair Mp1, and the demodulation circuit 560, the integrated circuit Q2 including the gate drive circuit 730, the transistor pair Mp2 including the transistors M3, M4, and the demodulation circuit 560 are disposed along the X axis from the −X side toward the +X side in the order of the transistor pair Mp2, the demodulation circuit 560, and the integrated circuit Q2, and the transistor pair Mp1, the transistor pair Mp2, and the demodulation circuit 560 are disposed along the X axis from the −X side toward the +X side in the order of the transistor pair Mp1, the transistor pair Mp2, and the demodulation circuit 560.

In the drive circuit board 300 configured as described above, the integrated circuit Q1 including the gate drive circuit 530, the transistor pair Mp1, and the demodulation circuit 560 are disposed along the X axis from the −X side toward the +X side in the order of the integrated circuit Q1, the transistor pair Mp1, and the demodulation circuit 560. That is, the gate drive circuit 530, the transistor pair Mp1, and the demodulation circuit 560 are arranged along a generation process of generating the drive signal COM from the base drive signal dA. This reduces the possibility that the wiring pattern formed on the wiring board 310 becomes complicated, and as a result, the reduction in size of the wiring board 310 can be realized, and the possibility that noise is superimposed on the signal propagated on the wiring board 310 is also reduced.

Further, since the integrated circuit Q2 including the gate drive circuit 730, the transistor pair Mp2, and the demodulation circuit 560 are disposed along the X axis from the −X side toward the +X side in the order of the transistor pair Mp2, the demodulation circuit 560, and the integrated circuit Q2, the length of the wiring in which the first amplified modulation signal AMS1 and the second amplified modulation signal AMS2, which are high-frequency signals, propagate can be shortened. As a result, the waveform accuracy of the second amplified modulation signal AMS2 input to the demodulation circuit 560 is improved, and the waveform accuracy of the drive signal COM corresponding to the second amplified modulation signal AMS2 is improved.

Since the transistor pair Mp1, the transistor pair Mp2, and the demodulation circuit 560 are arranged along the X axis from the −X side toward the +X side in the order of the transistor pair Mp1, the transistor pair Mp2, and the demodulation circuit 560, the transistor pair Mp1, the transistor pair Mp2, and the demodulation circuit 560 are also arranged along a generation process of generating the drive signal COM from the base drive signal dA. Therefore, the possibility that the wiring pattern formed on the wiring board 310 becomes complicated reduces, and as a result, the reduction in size of the wiring board 310 can be realized, and the possibility that noise is superimposed on the signal propagated on the wiring board 310 is also reduced.

Further, in the drive circuit board 300 of the present embodiment, the transistors M1, M2, M3, and M4 and the integrated circuits Q1, Q2 are disposed on the wiring board 310 so that the shortest distance between the transistor pair Mp1 including the transistors M1, M2 and the integrated circuit Q1 including the gate drive circuit 530 becomes shorter than the shortest distance between the transistor pair Mp2 including the transistors M3, M4 and the integrated circuit Q2 including the gate drive circuit 730. Accordingly, the lengths of the wiring of the gate signals HGD1, LGD1 output by the gate drive circuit 530 provided to the integrated circuit Q1 can be shortened. As a result, the waveform accuracy of the gate signals HGD1, LGD1 input to the transistors M1, M2 is improved, and the driving accuracy of the transistors M1, M2 is improved. Therefore, the waveform accuracy of the first amplified modulation signal AMS1 generated by drive of the transistors M1, M2 is improved.

Further, at least a part of the capacitor 562 provided to the demodulation circuit 560 is located between the integrated circuit Q1 and the inductor 561 when viewed from the direction along the Y axis. This makes it possible to shorten the wiring length of the feedback path including the feedback circuit 570 that feeds back the drive signal COM to the integrated circuit Q1. As a result, the accuracy of the feedback control in the drive circuit 50 is improved, and the waveform accuracy of the drive signal COM output by the drive circuit 50 is improved.

Further, the integrated circuit Q1 including the gate drive circuit 530, the transistor pair Mp1 including the transistors M1, M2, the integrated circuit Q2 including the gate drive circuit 730, the transistor pair Mp2 including the transistors M3, M4, and the capacitor Cvh for stabilizing the voltage value of the voltage signal VHV1 are disposed along the X axis along the direction from the −X side toward the +X side in the order of the integrated circuit Q1, the capacitor Cvh, the transistor pair Mp1, the transistor pair Mp2, and the integrated circuit Q2. Specifically, the capacitor Cvh is disposed such that the shortest distance between the capacitor Cvh and the transistor pair Mp1 including the transistors M1, M2 is shorter than the shortest distance between the capacitor Cvh and the transistor pair Mp2 including the transistors M3, M4.

As described above, the frequencies of the gate signals HGD1, LGD1 output by the integrated circuit Q1 are higher than the frequencies of the gate signals HGD2, LGD2 output by the integrated circuit Q2, and therefore, the driving frequencies of the transistors M1, M2 are higher than the driving frequencies of the transistors M3, M4. By the capacitor Cvh that stabilizes the voltage value of the voltage signal VHV1 being located in the vicinity of the transistors M1, M2 driven with such high frequencies, the possibility that the voltage value of the voltage signal VHV1 input to the transistors M1, M2 fluctuates is further reduced, and the feedback path in which the high-frequency current generated by the drive of the transistors M1, M2 returns to the capacitor Cvh can be shortened. This improves the accuracy of the signal waveform of the first amplified modulation signal AMS1 generated by the drive of the transistors M1, M2, and also improves the stability of the operation of the drive circuit 50.

In this case, by the capacitor Cvh being located so that the capacitor Cvh and the transistors M3, M4 are shorter than the shortest distance between the capacitor Cvh and the demodulation circuit 560, the accuracy of the voltage signal VHV2 corresponding to the voltage signal VHV1 supplied to the transistor pair Mp2 including the transistors M3, M4 is also improved. As a result, the accuracy of the signal waveform of the second amplified modulation signal AMS2 is also improved.

Further, the capacitors C13*a*, C13*b* provided to the bootstrap circuit BS that supplies the voltage signal VHV2 corresponding to the voltage signal VHV1 to the transistor pair Mp2 including the transistors M3, M4 are arranged such that the shortest distance between the capacitors C13*a*, C13*b* and the transistor pair Mp1 becomes longer than the shortest distance between the capacitors C13*a*, C13*b* and the transistor pair Mp2, and the shortest distance between the capacitors C13*a*, C13*b* and the transistor pair Mp2 is shorter than the shortest distance between the capacitors C13*a*, C13*b* and the integrated circuit Q2 including the gate drive circuit 730. That is, the capacitors C13*a*, C13*b* provided to the bootstrap circuit BS are disposed closer to the transistor pair Mp2 than to the transistor pair Mp1. Further, in this case, the capacitors C13*a*, C13*b* are preferably arranged such that the shortest distance between the capacitors C13*a*, C13*b* and the drain terminal of the transistor M3 becomes shorter than the shortest distance between the capacitors C13*a*, C13*b* and the source terminal of the transistor M3.

Thus, the signal stability of the voltage signal VHV2 corresponding to the voltage signal VHV1 supplied to the transistor M3 as the transistor pair Mp2 is improved. As a result, the accuracy of the signal waveform of the second amplified modulation signal AMS2 generated by the transistor pair Mp2 is improved, and the accuracy of the signal waveform of the drive signal COM corresponding to the second amplified modulation signal AMS2 is improved.

Figure 9:
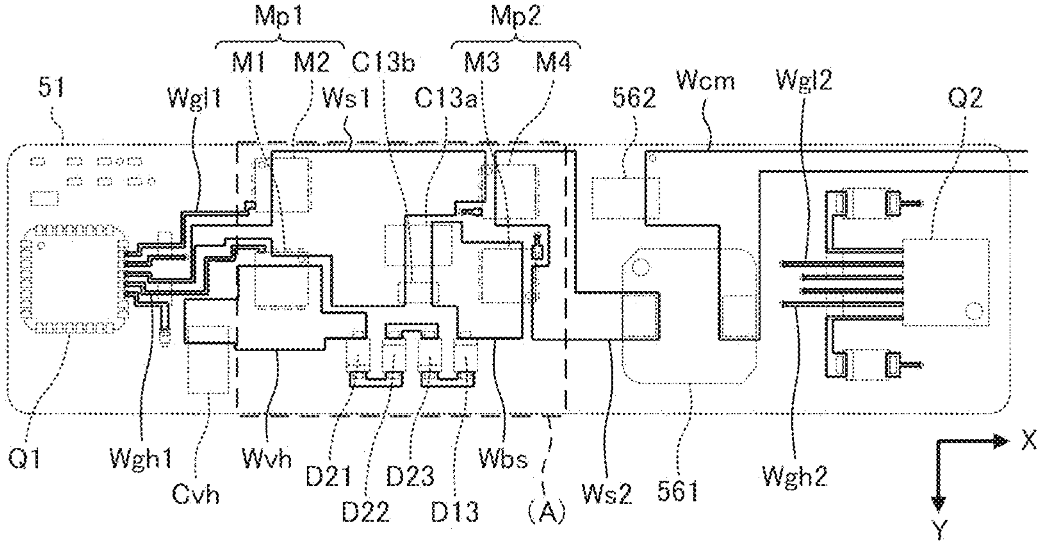
FIG. 9 is a diagram illustrating an example of a wiring pattern formed in the drive circuit mounting region.

Then, an example of the wiring pattern formed in the drive circuit mounting region 51 of the wiring board 310 on which the drive circuit 50 configured as described above is mounted will be described. FIG. 9 is a diagram illustrating an example of the wiring pattern formed in the drive circuit mounting region 51. In FIG. 9, a part of the drive circuit 50 to be mounted in the drive circuit mounting region 51 is illustrated by a broken line.

As shown in FIG. 9, the integrated circuit Q1 and the transistor M1 are electrically coupled to each other with a wiring line Wgh1. That is, the gate signal HGD1 output by the gate driver 531 in the integrated circuit Q1 propagates through the wiring line Wgh1 and is input to the transistor M1. Further, the integrated circuit Q1 and the transistor M2 are electrically coupled to each other with a wiring line Wgl1. That is, the gate signal LGD1 output by the gate driver 532 in the integrated circuit Q1 propagates through the wiring line Wgl1 and is input to the transistor M2. Thus, the transistors M1, M2 are driven.

One end of the capacitor Cvh, the drain terminal of the transistor M1, and the anode terminal of the diode D21 are electrically coupled to a wiring line Wvh. The voltage signal VHV1 supplied through a wiring pattern (not shown) propagates to the wiring line Wvh.

The source terminal of the transistor M1, the drain terminal of the transistor M2, the source terminal of the transistor M4, one ends of the capacitors C13*a*, C13*b*, and the integrated circuit Q1 are electrically coupled to a wiring line Ws1. In the wiring line Ws1, the first amplified modulation signal AMS1 is generated by the drive of the transistors M1, M2. That is, the wiring line Ws1 corresponds to the first output point OP1.

The other ends of the capacitors C13*a*, C13*b*, the drain terminal of the transistor M3, and the cathode terminal of the diode D13 are electrically coupled to a wiring line Wbs. Further, the anode terminal of the diode D13 is electrically coupled to the cathode terminal of the diode D23, the anode terminal of the diode D23 is electrically coupled to the cathode terminal of the diode D22, and the anode terminal of the diode D22 is electrically coupled to the cathode terminal of the diode D21. That is, the wiring line Wbs is electrically coupled to the wiring line Wvh via the diodes D13, D21, D22, and D23.

In the wiring line Wbs1, there is generated the voltage signal VHV2 obtained by shifting the reference potential of the first amplified modulation signal AMS1 generated in the wiring line Ws1 by a voltage value obtained by subtracting a sum of the forward drop voltage Vf1 of the diode D13, the forward drop voltage Vf2 of the diode D21, the forward drop voltage Vf3 of the diode D22, and the forward drop voltage Vf4 of the diode D23 from the voltage vhv1 as the voltage value of the voltage signal VHV1 in accordance with the charges stored in the capacitors C13*a*, C13*b*.

Further, the integrated circuit Q2 and the transistor M3 are electrically coupled to each other via a wiring line Wgh2 and a via wiring (not shown). That is, the gate signal HGD2 output by the gate driver 731 of the integrated circuit Q2 propagates through the wiring line Wgh2 and is input to the transistor M3. Further, the integrated circuit Q2 and the transistor M4 are electrically coupled to each other via a wiring line Wgl2 and a via wiring (not shown). That is, the gate signal LGD2 output by the gate driver 732 in the integrated circuit Q2 propagates through the wiring line Wgl2 and is input to the transistor M4. Thus, the transistors M3, M4 are driven.

The source terminal of the transistor M3, the drain terminal of the transistor M4, and the inductor 561 are electrically coupled to the wiring line Ws2. Then, during a period in which the drain terminal and the source terminal of the transistor M3 are controlled to be conductive, the voltage signal VHV2 propagating through the wiring line Wbs is supplied to the wiring line Ws2 via the transistor M3, and during a period in which the drain terminal and the source terminal of the transistor M4 are controlled to be conductive, the first amplified modulation signal AMS1 propagating through the wiring line Ws1 is input to the wiring line Ws2 via the transistor M4. That is, the wiring line Ws2 corresponds to the second output point OP2, and the second amplified modulation signal AMS2 is generated in the wiring line Ws2.

The inductor 561 and the capacitor 562 are electrically coupled to a wiring line Wcm. Further, the second amplified modulation signal AMS2 is input to the wiring line Wcm via the inductor 561. Accordingly, the drive signal COM obtained by smoothing the second amplified modulation signal AMS2 input via the inductor 561 by the inductor 561 and the capacitor 562 is generated in the wiring line Wcm.

The drive circuit 50 outputs the drive signal COM generated in the wiring line Wcm. That is, the wiring line Wcm is electrically coupled to the corresponding terminal TM of the connector CN.

Figure 10:
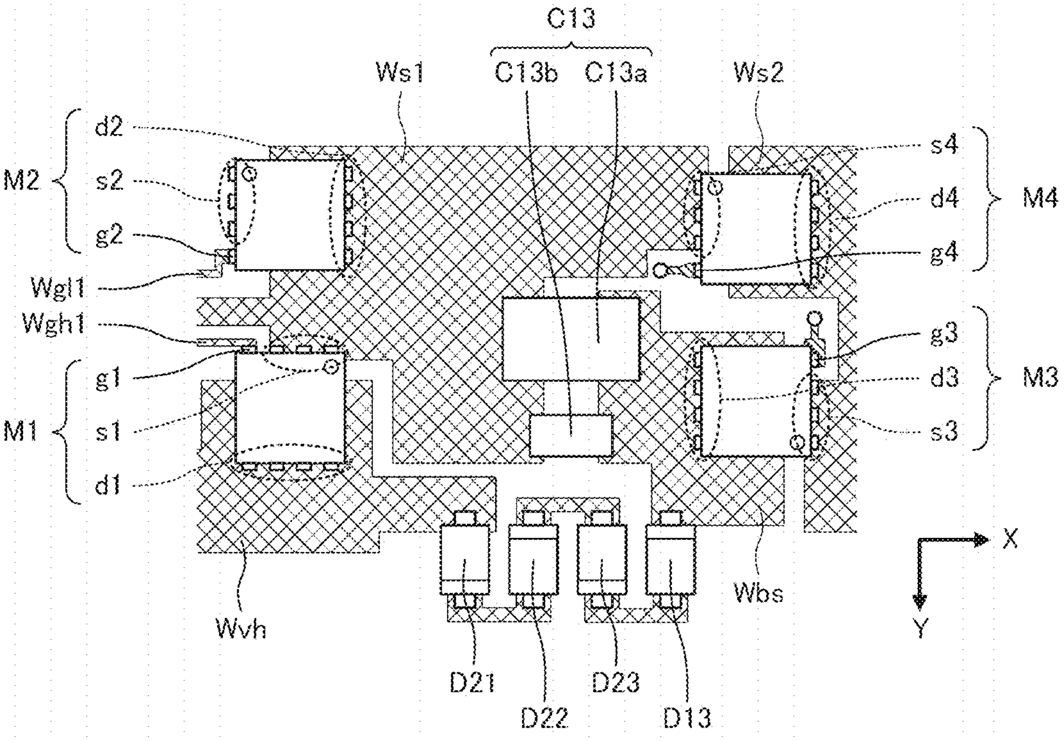
FIG. 10 is an enlarged view of the part (A) of FIG. 9.

Here, an example of a mounting configuration in which the transistors M1, M2, M3, and M4 are mounted on the wiring board 310 will be described. FIG. 10 is a diagram illustrating an example of the mounting configuration of the transistors M1, M2, M3, and M4 on the wiring board 310, and is an enlarged view of a portion (A) of FIG. 9.

As shown in FIG. 10, the transistor M1 includes one gate terminal g1, three source terminals s1, and four drain terminals d1. The transistor M1 is mounted on the wiring board 310 such that the gate terminal g1 is located at the −Y side of a mold part of the transistor M1, the three source terminals s1 are located side by side along the X axis at the −Y side of the mold part of the transistor M1, and at the +X side of the gate terminal g1 of the transistor M1, and the four drain terminals d1 are located side by side along the X axis at the +Y side of the mold part of the transistor M1.

Further, the transistor M2 includes one gate terminal g2, three source terminals s2, and four drain terminals d2. The transistor M2 is mounted on the wiring board 310 such that the gate terminal g2 is located at the −X side of a mold part of the transistor M2, the three source terminals s2 are located side by side along the Y axis at the −X side of the mold part of the transistor M2, and at the −Y side of the gate terminal g2 of the transistor M2, and the four drain terminals d2 are located side by side along the Y axis at the +X side of the mold part of the transistor M2.

That is, the transistor M2 is arranged such that the shortest distance between the source terminals s2 of the transistor M2 and the side 311 is shorter than the shortest distance between the drain terminals d2 of the transistor M2 and the side 311, and the transistor M1 is arranged such that the shortest distance between the source terminals s1 of the transistor M1 and the transistor M2 is shorter than the shortest distance between the drain terminals d1 of the transistor M1 and the transistor M2. Further, the transistor M1 and the transistor M2 are disposed to at least partially overlap each other when viewed from a direction along the Y axis orthogonal to the direction along the X axis. In other words, the mounting direction of the transistor M1 is different by 90 degrees from the mounting direction of the transistor M2.

In the transistor M1 and the transistor M2 mounted as described above, the gate terminal g1 of the transistor M1 electrically coupled to the integrated circuit Q1 and the gate terminal g2 of the transistor M2 electrically coupled to the integrated circuit Q1 are both located at the −X side where the integrated circuit Q1 is disposed. In this case, the gate terminal g1 of the transistor M1 electrically coupled to the integrated circuit Q1 is located in the vicinity of the gate terminal g2 of the transistor M2 electrically coupled to the integrated circuit Q1. That is, the transistor M1 is arranged such that the shortest distance between the gate terminal g1 of the transistor M1 and the integrated circuit Q1 including the gate drive circuit 530 is shorter than the shortest distance between the drain terminals d1 of the transistor M1 and the integrated circuit Q1 including the gate drive circuit 530, and the transistor M2 is arranged such that the shortest distance between the gate terminal g2 of the transistor M2 and the integrated circuit Q1 including the gate drive circuit 530 is shorter than the shortest distance between the drain terminals d2 of the transistor M2 and the integrated circuit Q1 including the gate drive circuit 530.

This makes it possible to reduce the difference between the wiring length of the wiring line Wgh1 for electrically coupling the gate terminal g1 of the transistor M1 and the integrated circuit Q1 and the wiring length of the wiring line Wgl1 for electrically coupling the gate terminal g2 of the transistor M2 and the integrated circuit Q1. Therefore, a possibility that a signal delay occurs between the gate signal HGD1 input to the gate terminal g1 of the transistor M1 and the gate signal HGD1 input to the gate terminal g2 of the transistor M2 is reduced. As a result, the accuracy of the signal waveform of the first amplified modulation signal AMS1 generated by the drive of the transistors M1, M2 is improved.

Further, in the transistor M1 and the transistor M2 mounted as described above, the source terminals s1 of the transistor M1 electrically coupled to the first output point OP1 are located in the vicinity of the drain terminals d2 of the transistor M2 electrically coupled to the first output point OP1. This reduces the possibility that the wiring of the wiring line Ws1 corresponding to the first output point OP1 is routed in a complicated manner. As a result, the possibility that noise is superimposed on the first amplified modulation signal AMS1 generated in the wiring line Ws1 corresponding to the first output point OP1 is reduced, and the accuracy of the signal waveform of the first amplified modulation signal AMS1 output from the first output point OP1 is improved.

Further, the transistor M3 includes one gate terminal g3, three source terminals s3, and four drain terminals d3. The transistor M3 is mounted on the wiring board 310 such that the gate terminal g3 is located at the +X side of a mold part of the transistor M3, the three source terminals s3 are located side by side along the Y axis at the +X side of the mold part of the transistor M3, and at the +Y side of the gate terminal g3 of the transistor M3, and the four drain terminals d3 are located side by side along the Y axis at the −X side of the mold part of the transistor M3.

Further, the transistor M4 includes one gate terminal g4, three source terminals s4, and four drain terminals d4. The transistor M4 is mounted on the wiring board 310 such that the gate terminal g4 is located at the −X side of a mold part of the transistor M4, the three source terminals s4 are located side by side along the Y axis at the −X side of the mold part of the transistor M4, and at the −Y side of the gate terminal g4 of the transistor M4, and the four drain terminals d4 are located side by side along the Y axis at the +X side of the mold part of the transistor M4.

That is, the transistor M3 is arranged such that the shortest distance between the source terminals s3 of the transistor M3 and the demodulation circuit 560 is shorter than the shortest distance between the drain terminals d3 of the transistor M3 and the demodulation circuit 560, and the transistor M4 is arranged such that the shortest distance between the drain terminals d4 of the transistor M4 and the demodulation circuit 560 is shorter than the shortest distance between the source terminals s4 of the transistor M4 and the demodulation circuit 560. Further, the transistor M3 is arranged such that the shortest distance between the drain terminals d3 of the transistor M3 and the transistor pair Mp1 is shorter than the shortest distance between the source terminals s3 of the transistor M3 and the transistor pair Mp1, and the transistor M4 is arranged such that the shortest distance between the source terminals s4 of the transistor M4 and the transistor pair Mp1 is shorter than the shortest distance between the drain terminals d4 of the transistor M4 and the transistor pair Mp1. In other words, the mounting direction of the transistor M3 is different by 180 degrees from the mounting direction of the transistor M4.

In the transistor M3 and the transistor M4 mounted as described above, when the operation mode of the level shift circuit 750 is the first mode MD1 in which the first amplified modulation signal AMS1 is output as the second amplified modulation signal AMS2, the first amplified modulation signal AMS1 generated in the wiring line Ws1 is propagated to the wiring line Ws2 as the second amplified modulation signal AMS2 via the transistor M3. Then, the second amplified modulation signal AMS2 propagated to the wiring line Ws2 is smoothed by the inductor 561 and the capacitor 562. On the other hand, when the operation mode of the level shift circuit 750 is the second mode MD2 in which the signal obtained by shifting the reference potential of the first amplified modulation signal AMS1 is output as the second amplified modulation signal AMS2, the signal obtained by shifting the reference potential of the first amplified modulation signal AMS1 generated in the wiring line Ws1 based on the charges stored in the capacitors C13*a*, C13*b* is propagated to the wiring line Ws2 as the second amplified modulation signal AMS2 via the transistor M4. Then, the second amplified modulation signal AMS2 propagated to the wiring line Ws2 is smoothed by the inductor 561 and the capacitor 562.

That is, in the drive circuit board 300 of the present embodiment, when generating the second amplified modulation signal AMS2 based on the first amplified modulation signal AMS1, the signal is propagated from the −X side to the +X side via substantially the same propagation path without the propagation path when the operation mode of the level shift circuit 750 is the first mode MD1 and the propagation path when the operation mode of the level shift circuit 750 is the second mode MD2 crossing each other. Thus, the possibility that the noise is superimposed on the second amplified modulation signal AMS2 based on the first amplified modulation signal AMS1 is reduced, and the signal accuracy of the second amplified modulation signal AMS2 is improved.

Here, the piezoelectric element 60 is an example of a capacitive load, and the drive signal COM is an example of a drive signal. Further, the gate drive circuit 530 and the integrated circuit Q1 loaded with the gate drive circuit 530 are an example of a first driver circuit, the gate signals HGD1, LGD1 output by the gate drive circuit 530 are an example of a first drive signal, the transistor pair Mp1 is an example of a first switching element pair, the first amplified modulation signal AMS1 generated by the drive of the transistor pair Mp1 is an example of a first switching signal, and a configuration including the modulation circuit 500 and the amplifier circuit 550 is an example of a first switching circuit. Further, the gate drive circuit 730 and the integrated circuit Q2 loaded with the gate drive circuit 730 are an example of a second driver circuit, the gate signals HGD2, LGD2 output by the gate drive circuit 730 are an example of a second drive signal, the transistor pair Mp2 is an example of a second switching element pair, the transistor M3 provided to the transistor pair Mp2 is an example of a high-potential side transistor, the transistor M4 provided to the transistor pair Mp2 is an example of a low-potential side transistor, the second output point OP2 is an example of a coupling point, the second amplified modulation signal AMS2 generated by the drive of the transistor pair Mp2 is an example of a second switching signal, and the level shift circuit 750 is an example of a second switching circuit. Further, the demodulation circuit 560 is an example of a smoothing circuit, the bootstrap circuit BS is an example of a bootstrap circuit, the capacitor C13*a* provided to the bootstrap circuit BS is an example of a first capacitor, the capacitor C13*b* provided to the bootstrap circuit BS is an example of a second capacitor, and the diode D13 provided to the bootstrap circuit BS is an example of a diode. Further, the voltage signal VHV1 is an example of the power supply voltage, the base drive signal aA as the analog signal output by the DA conversion circuit 510 is an example of an analog base drive signal, and at least one of the pulse modulation circuit 520 and the modulation circuit 500 including the pulse modulation circuit 520 is an example of a modulation circuit.

5 Functions and Advantages

In the drive circuit board 300 provided to the liquid ejection apparatus 1 according to the present embodiment configured as described above, by the drive circuit 50, that outputs the drive signal COM corresponding to the base drive signal dA, including the amplifier circuit 550 including the gate drive circuit 530 for outputting the gate signals HGD1, LGD1 corresponding to the base drive signal dA, and the transistor pair Mp1 including the transistors M1, M2 that are driven in accordance with the gate signals HGD1, LGD1 to output the first amplified modulation signal AMS1, the level shift circuit 750 that includes the gate drive circuit 730 for outputting the gate signals HGD2, LGD2 corresponding to the base drive signal dA, and the transistor pair Mp2 including the transistors M3, M4 that are driven in accordance with the gate signals HGD2, LGD2 to output the second amplified modulation signal AMS2 corresponding to the first amplified modulation signal AMS1, and the demodulation circuit 560 that smooths the second amplified modulation signal AMS2 to output the second amplified modulation signal AMS2 as the drive signal COM, it is possible to make the voltage value that is used when amplifying the base drive signal dA to generate the drive signal, and that is the voltage value of the voltage signal VHV1 lower than the voltage value of the drive signal COM to be output. This reduces the loss generated in each of the transistors M1, M2, M3, and M4. As a result, the power consumption in the drive circuit 50 is reduced, and the power consumption of the liquid ejection apparatus 1 and the drive circuit board 300 provided to the liquid ejection apparatus 1 can be reduced.

Further, in the drive circuit board 300 provided to the liquid ejection apparatus 1 according to the present embodiment, even when the drive circuits 50-1 to 50-7 are mounted on the wiring board 310 as the plurality of drive circuits 50, by the drive circuit 50-1, the integrated circuit Q3, and the connector CN being disposed along the X axis along the direction from the −X side toward the +X side in the order of the integrated circuit Q3, the drive circuit 50-1, and the connector CN, and by the drive circuits 50-1 to 50-7 being provided to at least partially overlap each other when viewed from the direction along the Y axis orthogonal to the X axis, the possibility that the wiring pattern becomes complicated when generating the drive signals COM1 to COM7 corresponding to the base drive signals dA1 to dA7 is reduced. As a result, it is possible to reduce the size of the wiring board 310 provided to the drive circuit board 300, the possibility that the noise is superimposed on various signals propagated on the drive circuit board 300 is reduced, and the accuracy of the signal waveforms of the drive signals COM1 to COM7 output from the drive circuit board 300 is improved.

In this case, by the integrated circuit Q1 including the gate drive circuit 530, the transistors M1, M2, and the demodulation circuit 560 provided to each of the drive circuits 50-1 to 50-7 being disposed along the X axis along the direction from the −X side toward the +X side in the order of the integrated circuit Q1, the transistors M1, M2, and the demodulation circuit 560, further by the integrated circuits Q1 including the gate drive circuits 530 provided to the respective drive circuits 50-1 to 50-7 being disposed to at least partially overlap each other when viewed from the direction along the Y axis, and by the transistors M1, M2 provided to the respective drive circuits 50-1 to 50-7 being disposed to at least partially overlap each other when viewed from the direction along the Y axis, the possibility that the wiring pattern becomes complicated when the drive circuits 50-1 to 50-7 generate the drive signals COM1 to COM7 corresponding to the base drive signals dA1 to dA7, respectively, is also reduced. As a result, it is possible to further reduce the size of the wiring board 310 provided to the drive circuit board 300, the possibility that the noise is superimposed on various signals propagated on the drive circuit board 300 is further reduced, and the accuracy of the signal waveforms of the drive signals COM1 to COM7 output from the drive circuit board 300 is further improved.

Further, by the integrated circuit Q2 including the gate drive circuit 730, the transistors M3, M4, and the demodulation circuit 560 provided to each of the drive circuits 50-1 to 50-7 being disposed along the X axis along the direction from the −X side toward the +X side in the order of the transistors M3, M4, the demodulation circuit 560, and the integrated circuit Q2, further by the integrated circuits Q2 including the gate drive circuits 730 provided to the respective drive circuits 50-1 to 50-7 being disposed to at least partially overlap each other when viewed from the direction along the Y axis, and by the transistors M3, M4 provided to the respective drive circuits 50-1 to 50-7 being disposed to at least partially overlap each other when viewed from the direction along the Y axis, the possibility that the wiring pattern becomes complicated when the drive circuits 50-1 to 50-7 generate the drive signals COM1 to COM7 corresponding to the base drive signals dA1 to dA7, respectively, is further reduced. As a result, it is possible to further reduce the size of the wiring board 310 provided to the drive circuit board 300, the possibility that the noise is superimposed on various signals propagated on the drive circuit board 300 is further reduced, and the accuracy of the signal waveforms of the drive signals COM1 to COM7 output from the drive circuit board 300 is further improved.

Further, in the drive circuit board 300 provided to the liquid ejection apparatus 1 according to the present embodiment, a capacitor Cvh for stabilizing the voltage value of the voltage signal VHV1 supplied to the transistor pair Mp1 and the transistor pair Mp2 is provided, and by the capacitor Cvh being disposed so that the shortest distance between the capacitor Cvh and the transistor pair Mp1 becomes shorter than the shortest distance between the capacitor Cvh and the transistor pair Mp2 when the frequencies of the gate signals HGD1, LGD1 input to the transistor pair Mp1 are higher than the frequencies of the gate signals HGD2, LGD2 input to the transistor pair Mp2, the possibility that the voltage value of the voltage signal VHV1 fluctuates due to the influence of the transistor pair Mp1 driven with a high driving frequency since the frequencies of the gate signals HGD1, LGD1 are high is reduced. Further, in this case, it is also possible to shorten the feedback path in which the high-frequency current generated by the transistor pair Mp1 driven with a high driving frequency is fed back to the capacitor Cvh. This improves the accuracy of the signal waveform of the first amplified modulation signal AMS1 generated by the drive of the transistors M1, M2, and also improves the stability of the operation of the drive circuit 50.

Further, in the drive circuit board 300 provided to the liquid ejection apparatus 1 according to the present embodiment, the drive circuit 50 includes a bootstrap circuit BS that includes the capacitor C13 and the diode D13, shifts the level of the voltage value of the voltage signal VHV1 supplied to the transistor pair Mp1 in accordance with the first amplified modulation signal AMS1, and supplies the result to the transistor pair Mp2 as the voltage signal VHV2. The capacitors C13*a*, C13*b* as the capacitor C13 provided to the bootstrap circuit BS are arranged such that the shortest distance between the capacitors C13*a*, C13*b* and the transistor pair Mp1 is longer than the shortest distance between the capacitors C13*a*, C13*b* and the transistor pair Mp2. That is, the capacitors C13*a*, C13*b* as the capacitor C13 provided to the bootstrap circuit BS are disposed closer to the transistor pair Mp2 than to the transistor pair Mp1. This reduces the possibility that the noise is superimposed on the voltage signal VHV2 supplied to the transistor pair Mp2, and as a result, the accuracy of the voltage signal VHV2 supplied to the transistor pair Mp2 is improved. Therefore, the accuracy of the second amplified modulation signal AMS2 output from the transistor pair Mp2 in accordance with the voltage signal VHV2 is also improved, and as a result, the accuracy of the drive signal COM generated based on the second amplified modulation signal AMS2 is also improved.

Further, in the drive circuit board 300 provided to the liquid ejection apparatus 1 according to the present embodiment, the transistor M3 provided to the drive circuit 50 is disposed such that the shortest distance between the source terminals s3 of the transistor M3 and the demodulation circuit 560 is shorter than the shortest distance between the drain terminals d3 of the transistor M3 and the demodulation circuit 560, and the transistor M4 is disposed such that the shortest distance between the drain terminals d4 of the transistor M4 and the demodulation circuit 560 is shorter than the shortest distance between the source terminals s4 of the transistor M4 and the demodulation circuit 560. That is, the transistors M3, M4 are mounted in a state of being rotated by 180 degrees. Accordingly, when the transistor pair Mp2 generates the second amplified modulation signal AMS2 corresponding to the first amplified modulation signal AMS1, it becomes possible to provide a propagation path when a signal corresponding to the first amplified modulation signal AMS1 is output via the transistor M3 and a propagation path when a signal corresponding to the first amplified modulation signal AMS1 is output via the transistor M4 in parallel to each other. As a result, the propagation path when the signal corresponding to the first amplified modulation signal AMS1 is output via the transistor M3 and the propagation path when the signal corresponding to the first amplified modulation signal AMS1 is output via the transistor M4 do not cross each other, and a possibility that a difference in the path length therebetween occurs is also reduced. As a result, the possibility that the noise is superimposed on the second amplified modulation signal AMS2 based on the first amplified modulation signal AMS1 is reduced, and the signal accuracy of the second amplified modulation signal AMS2 is improved.

Further, in the drive circuit board 300 provided to the liquid ejection apparatus 1 according to the present embodiment, the integrated circuits Q1, Q2, and the transistors M1, M2, M3, and M4 are disposed such that the distance between the integrated circuit Q1 including the gate drive circuit 530 that outputs the gate signals HGD1, LGD1 and the transistors M1, M2 that are driven by the gate signals HGD1, LGD1 is shorter than the distance between the integrated circuit Q2 including the gate drive circuit 730 that outputs the gate signals HGD2, LGD2 and the transistors M3, M4 that are driven by the gate signals HGD2, LGD2. Therefore, even when the frequencies of the gate signals HGD1, LGD1 input to the transistor pair Mp1 are higher than the frequencies of the gate signals HGD2, LGD2 input to the transistor pair Mp2, the possibility that the noise is superimposed on the gate signals HGD1, LGD1 is reduced, the transistors M1, M2 can be driven stably, the possibility that the noise caused by the conversion of the logic level of the gate signals HGD1, LGD1 is superimposed on the gate signals HGD2, LGD2 is reduced, and the drive of the transistors M3, M4 is also stabilized. As a result, the waveform accuracy of the first amplified modulation signal AMS1 generated by the drive of the transistors M1, M2 is improved, and the waveform accuracy of the second amplified modulation signal AMS2 generated by the drive of the transistors M1, M2 in accordance with the first amplified modulation signal AMS1 is also improved. As a result, the waveform accuracy of the drive signal COM corresponding to the second amplified modulation signal AMS2 is also improved.

Although the embodiment and the modified examples are described hereinabove, the present disclosure is not limited to the embodiment and can be implemented in various aspects without departing from the gist thereof. For example, the embodiments described above can appropriately be combined.

The present disclosure includes substantially the same configurations (e.g., configurations having the same functions, methods, and results, and configurations having the same purposes and advantages) as the configurations described in the embodiment. Further, the present disclosure includes configurations obtained by replacing non-essential portions of the configurations described in the embodiment. Furthermore, the present disclosure includes configurations that may exert the same functions and advantages or configurations that may achieve the same objects as those of the configurations described in the embodiment. Further, the present disclosure includes configurations obtained by adding a known technique to the configurations described in the embodiment.

The following configurations are derived from the embodiment described above.

One aspect of the drive circuit board is a drive circuit board configured to output a drive signal for driving a capacitive load, the drive circuit board including a drive circuit configured to output the drive signal corresponding to a base drive signal, and a wiring board provided with the drive circuit, wherein the drive circuit includes a first switching circuit including a first driver circuit configured to output a first drive signal corresponding to the base drive signal and a first switching element pair that is driven in accordance with the first drive signal to output a first switching signal, a second switching circuit including a second driver circuit configured to output a second drive signal corresponding to the base drive signal and a second switching element pair that is driven in accordance with the second drive signal to output a second switching signal corresponding to the first switching signal, a smoothing circuit configured to smooth the second switching signal and output the second switching signal thus smoothed as the drive signal, and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, and a shortest distance between the first capacitor and the first switching element pair is longer than a shortest distance between the first capacitor and the second switching element pair.

According to this drive circuit board, since the capacitor provided to the bootstrap circuit is located in the vicinity of the second switching element pair that operates with the signal output by the bootstrap circuit, the feedback path of a current generated by the drive of the second switching element pair is shortened, and the stability of the operation of the drive circuit board is improved.

In one aspect of the drive circuit board described above, the second switching element pair may include a high-potential side transistor and a low-potential side transistor, one end of the high-potential side transistor may be electrically coupled to the bootstrap circuit, one end of the low-potential side transistor may be supplied with the first switching signal, another end of the high-potential side transistor and another end of the low-potential side transistor may be electrically coupled to each other at a coupling point, and the second switching signal may be output from the coupling point, and a shortest distance between the first capacitor and the one end of the high-potential side transistor may be shorter than a shortest distance between the first capacitor and the another end of the high-potential side transistor.

According to this drive circuit board, since the capacitor provided to the bootstrap circuit is located in the vicinity of the high-potential side transistor supplied with the signal output by the bootstrap circuit, the propagation path of that signal supplied to the high-potential side transistor is shortened, and the possibility that noise is superimposed on the signal output by the bootstrap circuit is reduced.

In one aspect of the drive circuit board described above, a frequency of the first drive signal may be higher than a frequency of the second drive signal.

In one aspect of the drive circuit board described above, the shortest distance between the first capacitor and the second switching element pair may be shorter than a shortest distance between the first capacitor and the second driver circuit.

According to this drive circuit board, since the capacitor provided to the bootstrap circuit is located in the vicinity of the second switching element pair that operates with the signal output by the bootstrap circuit, the feedback path of a current generated by the drive of the second switching element pair is shortened, and the stability of the operation of the drive circuit board is improved.

In one aspect of the drive circuit board described above, the bootstrap circuit may include a second capacitor electrically coupled in parallel to the first capacitor.

According to this drive circuit board, it becomes possible to set the capacitance of the capacitor provided to the bootstrap circuit in a wide range, and the versatility of the drive circuit board is enhanced.

In one aspect of the drive circuit board described above, the first switching circuit may output the first switching signal obtained by amplifying a modulation signal based on the base drive signal, and the second switching circuit may output the second switching signal obtained by shifting a reference potential of the first switching signal based on the base drive signal.

In one aspect of the drive circuit board described above, the first switching circuit may include a DA conversion circuit configured to convert the base drive signal into an analog base drive signal, and a modulation circuit configured to output the modulation signal obtained by modulating the analog base drive signal.

One aspect of the liquid ejection apparatus includes a drive circuit board configured to output a drive signal for driving a capacitive load, and a print head configured to eject a liquid by driving the capacitive load, wherein the drive circuit board includes a drive circuit configured to output the drive signal corresponding to a base drive signal, and a wiring board provided with the drive circuit, the drive circuit includes a first switching circuit including a first driver circuit configured to output a first drive signal corresponding to the base drive signal and a first switching element pair that is driven in accordance with the first drive signal to output a first switching signal, a second switching circuit including a second driver circuit configured to output a second drive signal corresponding to the base drive signal and a second switching element pair that is driven in accordance with the second drive signal to output a second switching signal corresponding to the first switching signal, a smoothing circuit configured to smooth the second switching signal and output the second switching signal thus smoothed as the drive signal, and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, and a shortest distance between the first capacitor and the first switching element pair is longer than a shortest distance between the first capacitor and the second switching element pair.

According to this liquid ejection apparatus, since the capacitor provided to the bootstrap circuit is located in the vicinity of the second switching element pair that operates with the signal output by the bootstrap circuit, the feedback path of a current generated by the drive of the second switching element pair is shortened, and the stability of the operation of the drive circuit board is improved.

In one aspect of the liquid ejection apparatus described above, the second switching element pair may include a high-potential side transistor and a low-potential side transistor, one end of the high-potential side transistor may be electrically coupled to the bootstrap circuit, one end of the low-potential side transistor may be supplied with the first switching signal, another end of the high-potential side transistor and another end of the low-potential side transistor may be electrically coupled to each other at a coupling point, and the second switching signal may be output from the coupling point, and a shortest distance between the first capacitor and the one end of the high-potential side transistor may be shorter than a shortest distance between the first capacitor and the another end of the high-potential side transistor.

According to this liquid ejection apparatus, since the capacitor provided to the bootstrap circuit is located in the vicinity of the high-potential side transistor supplied with the signal output by the bootstrap circuit, the propagation path of that signal supplied to the high-potential side transistor is shortened, and the possibility that noise is superimposed on the signal output by the bootstrap circuit is reduced.

In one aspect of the liquid ejection apparatus described above, a frequency of the first drive signal may be higher than a frequency of the second drive signal.

In one aspect of the liquid ejection apparatus described above, the shortest distance between the first capacitor and the second switching element pair may be shorter than a shortest distance between the first capacitor and the second driver circuit.

According to this liquid ejection apparatus, since the capacitor provided to the bootstrap circuit is located in the vicinity of the second switching element pair that operates with the signal output by the bootstrap circuit, the feedback path of a current generated by the drive of the second switching element pair is shortened, and the stability of the operation of the drive circuit board is improved.

In one aspect of the liquid ejection apparatus described above, the bootstrap circuit may include a second capacitor electrically coupled in parallel to the first capacitor.

According to this liquid ejection apparatus, it becomes possible to set the capacitance of the capacitor provided to the bootstrap circuit in a wide range, and the versatility of the drive circuit board is enhanced.

In one aspect of the liquid ejection apparatus described above, the first switching circuit may output the first switching signal obtained by amplifying a modulation signal based on the base drive signal, and the second switching circuit may output the second switching signal obtained by shifting a reference potential of the first switching signal based on the base drive signal.

In one aspect of the liquid ejection apparatus described above, the first switching circuit may include a DA conversion circuit configured to convert the base drive signal into an analog base drive signal, and a modulation circuit configured to output the modulation signal obtained by modulating the analog base drive signal.

What is claimed is:

1. A drive circuit board configured to output a drive signal for driving a capacitive load, comprising:

a drive circuit configured to output the drive signal corresponding to a base drive signal; and a wiring board provided with the drive circuit, wherein the drive circuit includes:

a first switching circuit including a first driver circuit configured to output a first drive signal corresponding to the base drive signal and a first switching element pair that is driven in accordance with the first drive signal to output a first switching signal;

a second switching circuit including a second driver circuit configured to output a second drive signal corresponding to the base drive signal and a second switching element pair that is driven in accordance with the second drive signal to output a second switching signal corresponding to the first switching signal;

a smoothing circuit configured to smooth the second switching signal and output the second switching signal thus smoothed as the drive signal; and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, the first capacitor is located at a first position on the drive circuit board, the first switching element pair is located at a second position on the drive circuit board, and the second switching element pair is located at a third position on the drive circuit board, and a shortest distance on the drive circuit board between the first position and the second position is longer than a shortest distance on the drive circuit board between the first position and the third position.

2. The drive circuit board according to claim 1, wherein the second switching element pair includes a high-potential side transistor and a low-potential side transistor, one end of the high-potential side transistor is electrically coupled to the bootstrap circuit and located at a fourth position on the drive circuit board, one end of the low-potential side transistor is supplied with the first switching signal, another end of the high-potential side transistor and another end of the low-potential side transistor are electrically coupled to each other at a coupling point, and the second switching signal is output from the coupling point the another end of the high-potential side transistor is located at a fifth position on the drive circuit board, and a shortest distance on the drive circuit board between the first position and the fourth position is shorter than a shortest distance on the drive circuit board between the first position and the fourth position.

3. The drive circuit board according to claim 1, wherein a frequency of the first drive signal is higher than a frequency of the second drive signal.

4. The drive circuit board according to claim 1, wherein the second driver circuit is located at a sixth position on the drive circuit board, and the shortest distance on the drive circuit board between the first position and the third position is shorter than a shortest distance on the drive circuit board between the first position and the sixth position.

5. The drive circuit board according to claim 1, wherein the bootstrap circuit includes a second capacitor electrically coupled in parallel to the first capacitor.

6. The drive circuit board according to claim 1, wherein the first switching circuit is configured to output the first switching signal obtained by amplifying a modulation signal based on the base drive signal, and the second switching circuit is configured to output the second switching signal obtained by shifting a reference potential of the first switching signal based on the base drive signal.

7. The drive circuit board according to claim 6, wherein the first switching circuit includes a DA conversion circuit configured to convert the base drive signal into an analog base drive signal, and a modulation circuit configured to output the modulation signal obtained by modulating the analog base drive signal.

8. A liquid ejection apparatus comprising:

a drive circuit board configured to output a drive signal for driving a capacitive load; and a print head configured to eject a liquid by driving the capacitive load, wherein the drive circuit board includes:

a drive circuit configured to output the drive signal corresponding to a base drive signal; and a wiring board provided with the drive circuit, the drive circuit includes:

a first switching circuit including a first driver circuit configured to output a first drive signal corresponding to the base drive signal and a first switching element pair that is driven in accordance with the first drive signal to output a first switching signal;

a second switching circuit including a second driver circuit configured to output a second drive signal corresponding to the base drive signal and a second switching element pair that is driven in accordance with the second drive signal to output a second switching signal corresponding to the first switching signal;

a smoothing circuit configured to smooth the second switching signal and output the second switching signal thus smoothed as the drive signal; and a bootstrap circuit that includes a first capacitor and a diode, and is configured to shift a level of a voltage value of a power supply voltage to be supplied to the first switching element pair in accordance with the first switching signal, and then supply the power supply voltage the level of which is shifted to the second switching element, the first capacitor is located at a first position on the drive circuit board, the first switching element pair is located at a second position on the drive circuit board, and the second switching element pair is located at a third position on the drive circuit board, and a shortest distance on the drive circuit board between the first position and the second position is longer than a shortest distance on the drive circuit board between the first position and the third position.

9. The liquid ejection apparatus according to claim 8, wherein the second switching element pair includes a high-potential side transistor and a low-potential side transistor, one end of the high-potential side transistor is electrically coupled to the bootstrap circuit and located at a fourth position on the drive circuit board, one end of the low-potential side transistor is supplied with the first switching signal, another end of the high-potential side transistor and another end of the low-potential side transistor are electrically coupled to each other at a coupling point, and the second switching signal is output from the coupling point, the another end of the high-potential side transistor is located at a fifth position on the drive circuit board, and a shortest distance on the drive circuit board between the first position and the fourth position is shorter than a shortest distance on the drive circuit board between the first position and the fifth position.

10. The liquid ejection apparatus according to claim 8, wherein a frequency of the first drive signal is higher than a frequency of the second drive signal.

11. The liquid ejection apparatus according to claim 8, wherein the second driver circuit is located at a sixth position on the drive circuit board, and the shortest distance on the drive circuit board between the first position and the third position is shorter than a shortest distance on the drive circuit board between the first position and the sixth position.

12. The liquid ejection apparatus according to claim 8, wherein the bootstrap circuit includes a second capacitor electrically coupled in parallel to the first capacitor.

13. The liquid ejection apparatus according to claim 8, wherein the first switching circuit is configured to output the first switching signal obtained by amplifying a modulation signal based on the base drive signal, and the second switching circuit is configured to output the second switching signal obtained by shifting a reference potential of the first switching signal based on the base drive signal.

14. The liquid ejection apparatus according to claim 13, wherein the first switching circuit includes a DA conversion circuit configured to convert the base drive signal into an analog base drive signal, and a modulation circuit configured to output the modulation signal obtained by modulating the analog base drive signal.

* * * * *